US012784272B2

(12) United States Patent
Wang et al.

(10) Patent No.: US 12,784,272 B2
(45) Date of Patent: Nov. 3, 2026

(54) DISTANCE DETECTION METHOD AND APPARATUS, DEVICE, AND STORAGE MEDIUM

(71) Applicant: Tencent Technology (Shenzhen) Company Limited, Shenzhen (CN)

(72) Inventors: Jun Wang, Shenzhen (CN); Jinkun Hou, Shenzhen (CN); Runzeng Guo, Shenzhen (CN); Shaoming Wang, Shenzhen (CN); Xiaojie Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 210 days.

(21) Appl. No.: 18/898,440

(22) Filed: Sep. 26, 2024

(65) Prior Publication Data

US 2025/0022170 A1 Jan. 16, 2025

Related U.S. Application Data

(63) Continuation of application No. PCT/CN2023/118002, filed on Sep. 11, 2023.

(30) Foreign Application Priority Data

Nov. 16, 2022 (CN) ......................... 202211458072.1

(51) Int. Cl.

*G06T 7/73* (2017.01)
*G06T 7/80* (2017.01)
*G06V 40/12* (2022.01)

(52) U.S. Cl.

CPC .................. *G06T 7/74* (2017.01); *G06T 7/85* (2017.01); *G06V 40/1347* (2022.01); *G06T 2207/10028* (2013.01)

(58) Field of Classification Search

CPC ... G06T 7/70; G06T 7/74; G06T 2207/10028; G06V 10/96; G06V 40/10; G06V 40/12;
(Continued)

(56) References Cited

U.S. PATENT DOCUMENTS

| | | | | |
|---|---|---|---|---|
| 2007/0217660 | A1* | 9/2007 | Komura | G06V 10/469 382/115 |
| 2021/0209780 | A1 | 7/2021 | Kimura | |
| 2021/0406531 | A1* | 12/2021 | Lau | G06F 18/253 |

FOREIGN PATENT DOCUMENTS

| | | | |
|---|---|---|---|
| CN | 109784028 | A | 5/2019 |
| CN | 110458888 | A | 11/2019 |

(Continued)

OTHER PUBLICATIONS

Tencent Technology, ISR/ PCT/CN2023/118002, Dec. 26, 2023, 2 pgs.

(Continued)

*Primary Examiner* — Matthew C Bella
*Assistant Examiner* — Janice E. Vaz
(74) *Attorney, Agent, or Firm* — Morgan, Lewis & Bockius LLP

(57) ABSTRACT

A method for detecting a distance of a palm relative to an information acquisition device is performed by a computer device and the method includes: obtaining an image of a palm and at least one distance value of the palm acquired by the information acquisition device having a camera module and a plurality of distance sensors; determining position information of an identity marker in the image; determining, according to the at least one distance value, calibration positions corresponding to the plurality of distance sensors in the image; determining, according to the position information and the calibration positions corresponding to the plurality of distance sensors in the image, at least one target distance sensor detecting the identity marker in the plurality (Continued)

of distance sensors; and determining a distance between the identity marker and the information acquisition device according to the distance value acquired by the at least one target distance sensor.

20 Claims, 13 Drawing Sheets

(58) Field of Classification Search
CPC .. G06V 40/1347; G06V 10/255; G06V 40/70; G06Q 20/40145
See application file for complete search history.

(56) References Cited

FOREIGN PATENT DOCUMENTS

| | | | |
|---|---|---|---|
| CN | 112232223 | A | 1/2021 |
| JP | 2014078857 | A | 5/2014 |
| WO | WO 2004088979 | A1 | 10/2004 |
| WO | WO 2009110323 | A1 | 9/2009 |
| WO | WO 2021168838 | A1 | 9/2021 |

OTHER PUBLICATIONS

Tencent Technology, WO+IPRP, PCT/CN2023/118002, Apr. 29, 2025, 6 pgs.

* cited by examiner

DISTANCE DETECTION METHOD AND APPARATUS, DEVICE, AND STORAGE MEDIUM

CROSS-REFERENCE TO RELATED APPLICATIONS

This application is a continuation application of PCT Patent Application No. PCT/CN2023/118002, published as WO2024103932A1, entitled "DISTANCE DETECTION METHOD AND APPARATUS, DEVICE, AND STORAGE MEDIUM", filed on Sep. 11, 2023, which claims priority to Chinese Patent Application No. 2022114580721, entitled "DISTANCE DETECTION METHOD AND APPARATUS, DEVICE, AND STORAGE MEDIUM", filed on Nov. 16, 2022, both of which are incorporated herein by reference in their entirety.

FIELD OF THE TECHNOLOGY

Embodiments of this application relate to the field of machine learning technologies, further to the field of computer security technologies, and in particular, to a distance detection method and apparatus, a device, and a storage medium.

BACKGROUND OF THE DISCLOSURE

In a palm verification payment scenario, a payment verification device acquires a palm print of a user to perform palm verification payment according to the palm print. During payment, in order to avoid unintentional triggering of palm verification, a distance between a palm and a palm information acquisition device needs to be detected, and palm print verification is performed when the palm meets a payment distance requirement.

In the related art, a distance detection method is provided. In the method, a mapping relationship between a distance between a palm and a palm information acquisition device and a position of the palm in an image is pre-calibrated, the position of the palm in the image and palm key points are detected, and the distance between the palm and the palm information acquisition device is estimated according to distances between the palm key points in combination with the position of the palm in the image.

However, the distance between the palm and the palm information acquisition device estimated according to the foregoing method is not accurate enough, leading to security risks in palm verification.

SUMMARY

According to various embodiments of this application, a distance detection method and apparatus, a device, and a storage medium are provided.

According to an aspect, this application provides a method for detecting a distance of a palm relative to an information acquisition device performed by a computer device, the method including:

obtaining an image of a palm and at least one distance value of the palm acquired by the information acquisition device that has a camera module and a plurality of distance sensors uniformly distributed with the camera module as a center;

determining position information of an identity marker in the image;

determining, according to the at least one distance value, calibration positions corresponding to the plurality of distance sensors in the image;

determining, according to the position information and the calibration positions corresponding to the plurality of distance sensors in the image, at least one target distance sensor detecting the identity marker in the plurality of distance sensors; and determining a distance between the identity marker and the information acquisition device according to the distance value acquired by the at least one target distance sensor.

According to still another aspect, this application provides a computer device, including a processor and a memory, the memory having computer-readable instructions stored therein, and the computer-readable instructions being loaded and executed by the processor and causing the computer device to implement the distance detection method according to the embodiments of this application.

According to still another aspect, this application provides a non-transitory computer-readable storage medium, the computer-readable storage medium having computer-readable instructions stored therein, and the computer-readable instructions being loaded and executed by a processor of a computer device and causing the computer device to implement the distance detection method according to the embodiments of this application.

Details of one or more embodiments of this application are provided in the accompanying drawings and descriptions below. Other features and advantages of this application become more apparent with reference to the specification, the accompanying drawings, and the claims.

BRIEF DESCRIPTION OF THE DRAWINGS

To describe the technical solutions in the embodiments of this application or the conventional technology more clearly, the following briefly describes the accompanying drawings required for describing the embodiments or the conventional technology. Apparently, the accompanying drawings in the following descriptions show merely some embodiments of this application, and a person of ordinary skill in the art may still derive other accompanying drawings according to the disclosed accompanying drawings without creative efforts.

DESCRIPTION OF EMBODIMENTS

The technical solutions in the embodiments of this application are clearly and completely described below with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

Figure 1:
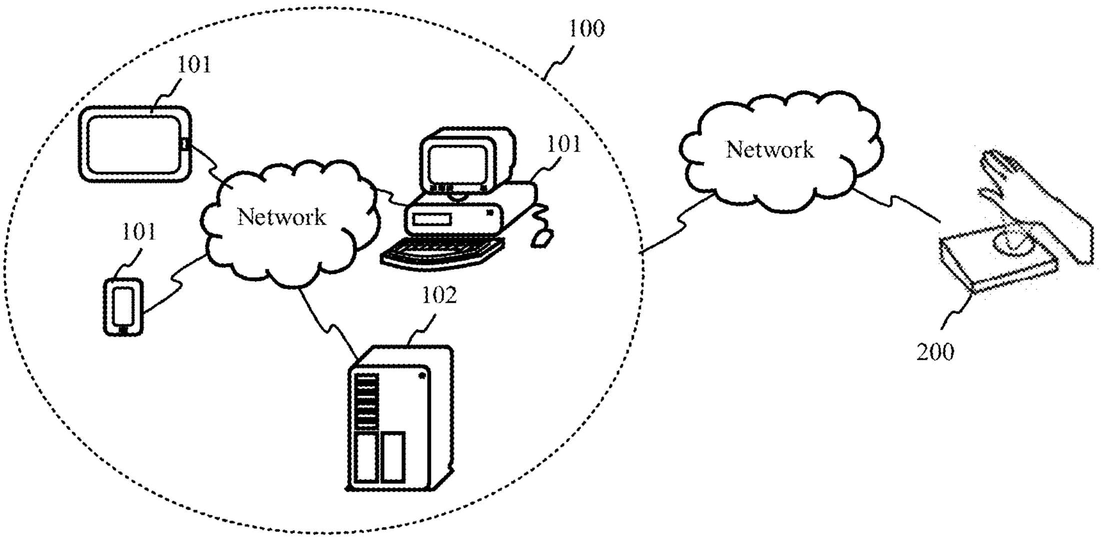
FIG. 1 is a schematic diagram of a solution implementation environment according to an embodiment of this application.

FIG. 1 is a schematic diagram of a solution implementation environment according to an embodiment of this application. The solution implementation environment may be implemented as a distance detection system architecture. The solution implementation environment may include: a computer device 100 and an information acquisition device 200.

Figure 2:
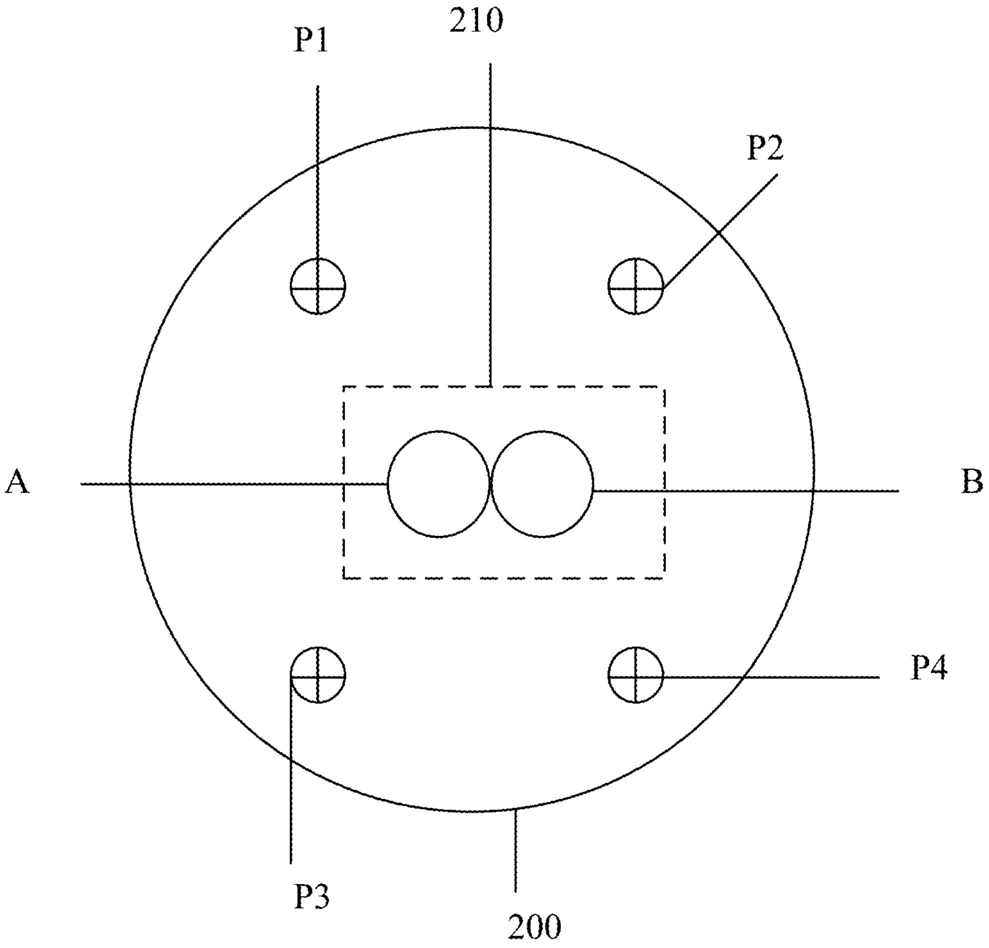
FIG. 2 is a schematic diagram of a palm information acquisition device according to an embodiment of this application.

The information acquisition device 200 is configured to acquire an image and a distance. The information acquisition device 200 includes a camera module and N distance sensors. N may be a positive integer. For example, N may be equal to 1 or may be greater than 1. As shown in FIG. 2, the information acquisition device 200 includes a camera module 210 and a distance sensor. In a specific example, as shown in FIG. 2, there are four distance sensors, which are respectively P1, P2, P3, and P4. In some embodiments, the camera module may include one camera or may include a plurality of cameras. For example, as shown in FIG. 2, the camera module 210 includes two cameras including a camera A and a camera B. A type of the camera in the camera module is not limited in this application. For example, the camera module includes a color camera and an infrared camera. Using a palm verification payment scenario as an example, the color camera is configured to acquire a color image of a palm, the infrared camera is configured to acquire a vein image of the palm, and a palm image may be obtained by combining the color image and the vein image; or different verifications may be performed by using the color image and the vein image, and a palm verification result may be obtained based on results of the different verifications. In some embodiments, there are a plurality of distance sensors, and the distance sensors may be uniformly distributed with the camera module as a center or may be non-uniformly distributed, which is not limited in this application. In some embodiments, a ranging plane of the distance sensor is located on the same plane as a lens plane of the camera module and is parallel to an imaging plane of the camera module. The ranging plane of the distance sensor is a plane used as a reference when the distance sensor performs distance detection. The ranging plane may be a plane on which a plurality of distance sensors are arranged or a plane parallel to the plane. When the plurality of distance sensors are arranged on a parallel approximately parallel to the ground plane, a direction in which the plurality of distance sensors detect a distance is approximately along a gravity line direction. In this case, the ranging plane may be a plane parallel to the ground plane. The imaging plane of the camera module is an imaging plane of an image acquired by the camera module, and is generally parallel to a plane on which a lens of the camera in the camera module is located, for example, a film plane of a film camera.

The computer device 100 is configured to determine a distance between an identity marker and the information acquisition device 200. As shown in FIG. 1, the computer device 100 may be a terminal device 101 or may be a server 102, which is not limited in this application. The terminal device 101 includes but is not limited to an electronic device such as a mobile phone, a tablet computer, a wearable device, a personal computer (PC), an in-vehicle terminal device, a smart speech interaction device, a smart home appliance, or an aerial vehicle. A client running a program may be installed in the terminal device 101, and the program provides a distance detection function. The program may be a payment service program, an access control management program, an information acquisition program, or the like, which is not limited in this application. For example, a client of a payment service program is installed in the terminal device 101. A user pays through palm verification. During palm verification, a distance between a palm and the information acquisition device 200 needs to be detected. For example, an access management program is installed in the terminal device 101, by verifying a distance between a to-be-verified person and the information acquisition device 200, a face of the person entering a recognition distance is detected, to determine whether the person has permission. In addition, this application does not limit a form of the program, including but not limited to an application (App), a child application program, a web program, and the like installed in a terminal. The child application program is a program running in a running environment provided by a parent application program. The parent application program is an independent native application program, and the child application program relies on the parent application program to run.

The server 102 may be an independent physical server, or may be a server cluster including a plurality of physical servers or a distributed system, or may be a cloud server that provides a cloud computing service. The server may be a backend server of the foregoing application program and is configured to provide backend services to a client of the application program.

In some embodiments, the computer device 100 and the information acquisition device 200 may be the same device. The device has functions of the computer device 100 and the information acquisition device 200. For example, the computer device 100 is a terminal device, and the information acquisition device 200 is a component of the terminal device configured to acquire an image and a distance. For example, the computer device 100 is a vending machine, and the information acquisition device 200 is a component configured to acquire an image and a distance on the vending machine.

In some embodiments, the computer device 100 and the information acquisition device 200 may alternatively be two different devices, and the computer device 100 and the information acquisition device 200 may communicate with each other. For example, the computer device 100 is a terminal device, and the information acquisition device 200 is an external device of the terminal device. In another example, the computer device 100 is a server, and the information acquisition device 200 is a device communicating with the server and configured to acquire an image and a distance. The computer device 100 and the information acquisition device 200 may communicate in a wired or wireless manner. The wired manner includes direct connection by using a data transmission cable or access to a network through a network cable for communication. The wireless manner may include a wireless network, Bluetooth, wireless radio frequency, or the like. This is not limited in this application.

An entity executing the operations of a distance detection method provided in the embodiments of this application may be a computer device, and the computer device may be an electronic device having data computing, processing, and storage capabilities. Using the solution implementation environment shown in FIG. 1 as an example, the distance detection method may be performed by the terminal device 101 (for example, a client of an application program installed and run in the terminal device 101 performs the distance detection method), the distance detection method may be performed by the server 102, or the distance detection method may be performed by the terminal device 101 and the server 102 in cooperation with each other. This is not limited in this application. For example, the terminal device 101 obtains the image and a distance value acquired by the information acquisition device 200, and transmits the image and the distance value to the server 102. The server 102 performs the foregoing distance detection method.

The identity marker in the embodiments of this application is an entity that can identify an identity, including but not limited to a palm, a face, a fingerprint, an eye iris, a piece of paper printed with a graphic code, or an electronic device displaying a graphic code. The graphic code may be a two-dimensional barcode or a barcode. The embodiments of this application may be applied to various scenarios, including but not limited to payment, information acquisition, permission confirmation, and the like. For example, the embodiments of this application may be applied to palm verification payment, face-based access control management, graphical code-based information acquisition, and the like. For case of description, in the following method embodiments, description is only provided by using an example in which the entity executing the operations of the distance detection method is a computer device.

Figure 3:
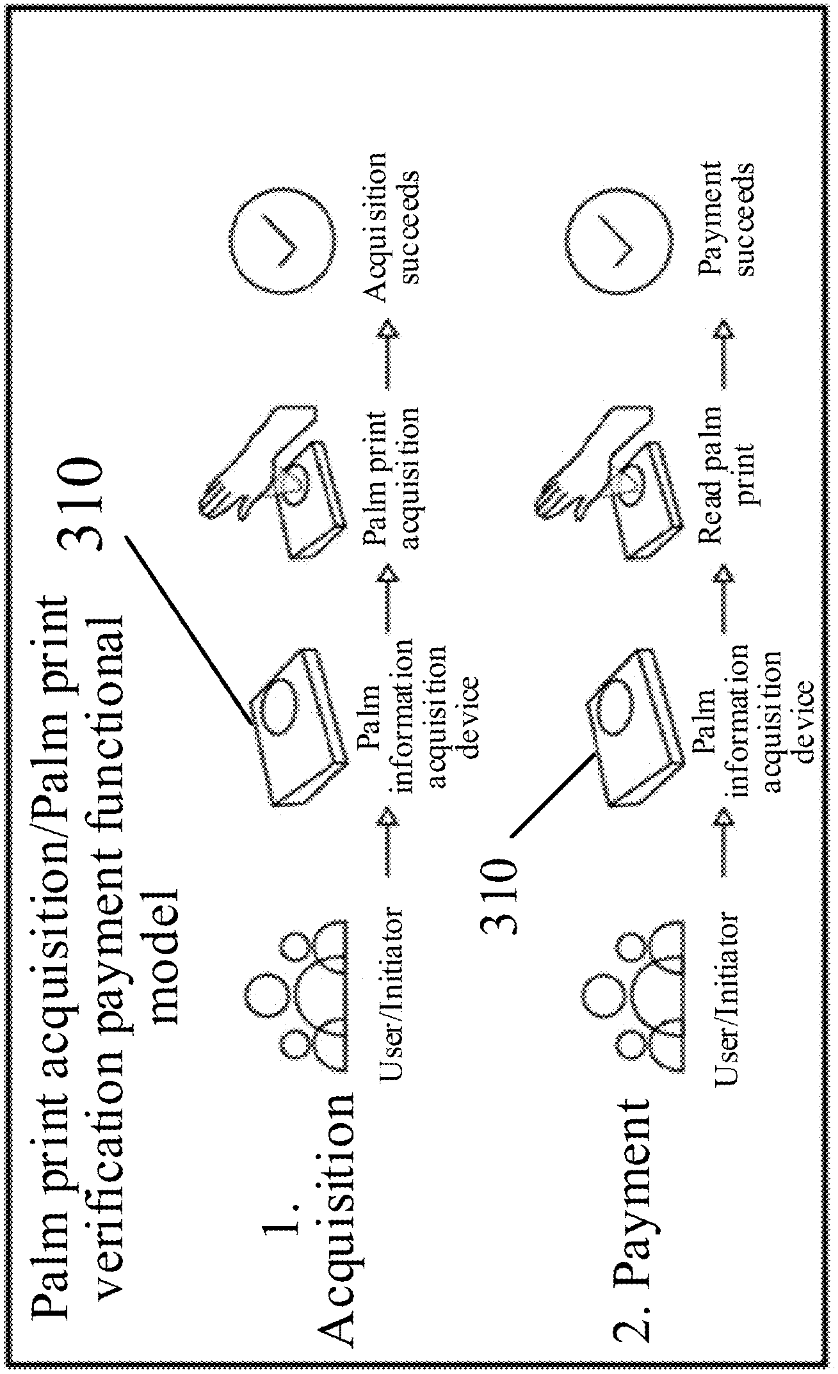
FIG. 3 is a schematic diagram of a palm verification payment scenario according to an embodiment of this application.

For example, as shown in FIG. 3, two scenarios are shown: the first scenario is a palm print acquisition scenario, and the second scenario is a palm verification payment scenario. In the palm print acquisition scenario, a user places a palm in an acquisition range of a palm information acquisition device 310, and the palm information acquisition device 310 acquires palm print information. After the palm print information is successfully acquired, the palm print information of the user is maintained in a palm print information library, and the palm print information is bound with user information of the user. In the palm verification payment scenario, a user places a palm in the acquisition range of the palm information acquisition device 310, the palm information acquisition device 310 acquires palm print information, compares the acquired palm print information with palm print information in a palm print information library, finds matched palm print information, and performs palm verification payment based on user information bound with the matched palm print information. In order to avoid unintentional triggering of palm verification, payment willingness of the user needs to be confirmed during payment, that is, to ensure that the palm of the user shows a relatively clear conscious stay during payment by the user, to prevent the palm from being misidentified when the palm arbitrarily swipes across the acquisition range of the palm information acquisition device 310 and resulting in wrong payment. A conscious stay of the palm of the user may be determined by determining a speed change of the palm. To accurately determine the speed change of the palm, a distance between the palm and the palm information acquisition device 310 needs to be accurately determined.

In the related art, the distance between the palm and the palm information acquisition device is mainly determined through a pure visual solution, and specifically, the distance between the palm and the palm information acquisition device is estimated based on an image itself. In the pure visual solution, assuming that during a palm verification payment process, a palm and a plane on which a camera lens of the palm information acquisition device is located remain parallel, and a distance between the palm and the camera is estimated based on a shape of the palm in the image.

Estimating the distance based on the pure visual solution has low costs, but the estimated distance is unreliable. It is assumed that a pose of the palm and the plane on which the camera lens is located remain parallel, and it is assumed that the palm is a standard palm with a standard shape. During actual use, differences in the size of the palm, different poses, image distortion, and the like all lead to deviations of the palm in the image from the standard palm, and further lead to deviations of distance estimation.

An embodiment of this application provides a distance detection method. A distance between an identity marker and an information acquisition device can be determined based on a distance value detected by a distance sensor and a calibration position corresponding to the distance sensor in an image. There is no need to calibrate a camera that acquires the image in advance, and impact of the differences in the size of the palm, the different poses, the image distortion, and the like can be avoided. The detected distance is more accurate, so that efficient and accurate verification on the identity marker can be implemented, repeated verification caused by inaccurate distance detection is avoided, thereby avoiding a waste of resources caused by repeated verification on the identity marker.

Figure 4:
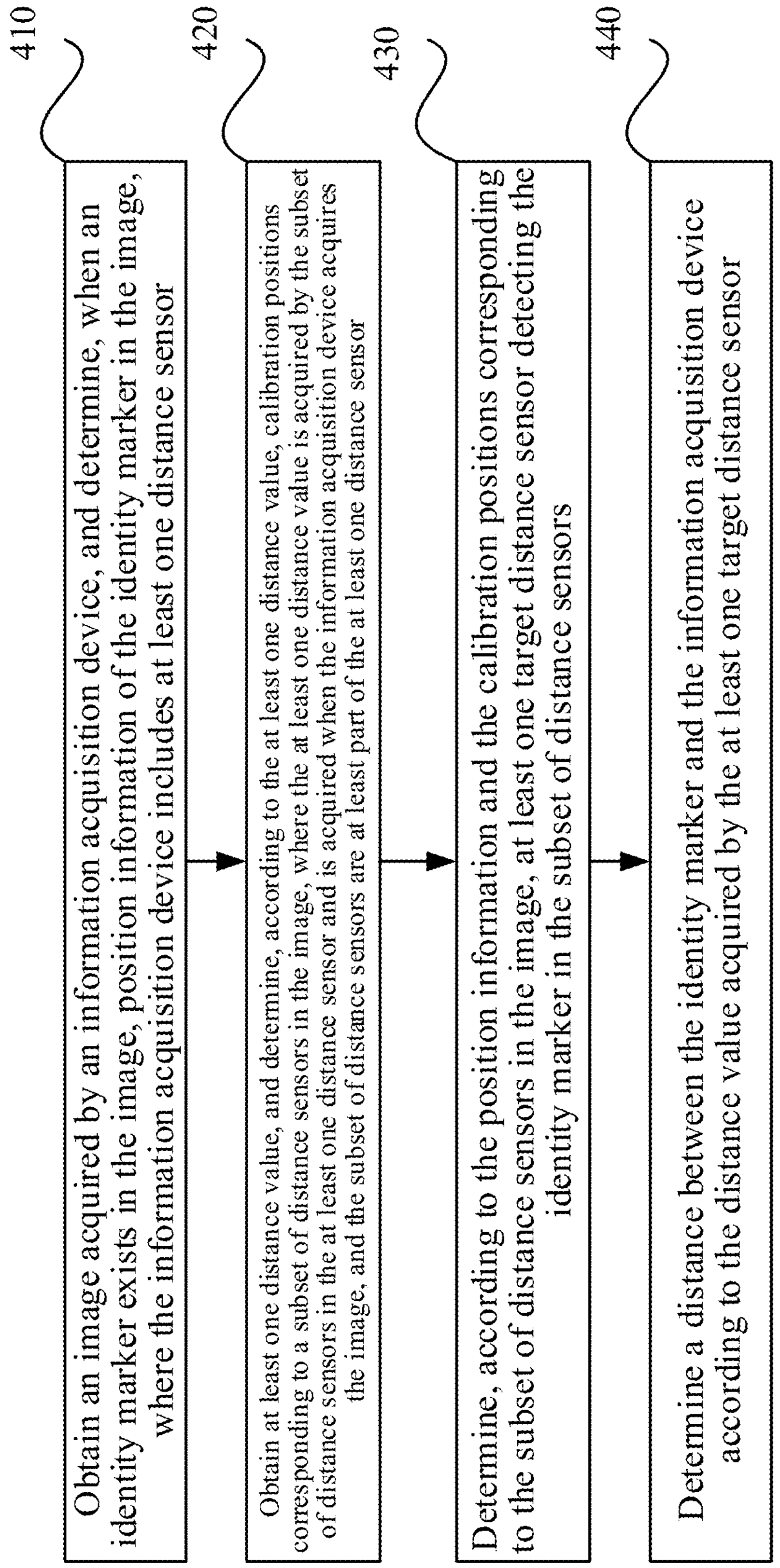
FIG. 4 is a flowchart of a distance detection method according to an embodiment of this application.

FIG. 4 is a flowchart of a distance detection method according to an embodiment of this application. The method may include at least one operation of Operation 410 to Operation 440 below.

Operation 410. Obtain an image acquired by an information acquisition device, and determine, when an identity marker exists in the image, position information of the identity marker in the image, where the information acquisition device includes at least one distance sensor.

The information acquisition device is a device that can acquire information from an environment, and the information acquisition device can acquire at least an image. The image is obtained by the information acquisition device performing image acquisition on an environment within a viewing angle range. The information acquisition device has a viewing angle range, which represents a range in which the information acquisition device can acquire image information from the environment. The information acquisition device may acquire different images at different moments. To distinguish different images, the different images may be referred to as a first image, a second image, and the like. The images may be acquired by the information acquisition device instantly, or may be acquired by the information acquisition device in history. For case of description, identity markers in the image all refer to portraits of physical identity markers in the image.

The identity marker is an entity that can identify an identity. The identity marker is also an entity that needs to be verified. For different application scenarios, the identity marker may be different entities. For example, in a palm verification permission scenario, the identity marker is a palm; in a fingerprint verification permission scenario, the identity marker is a finger; in a face verification permission scenario, the identity marker is a face; and in a graphic code scanning scenario, the identity marker is an entity with a graphic code. The entity with the graphic code refers to an item for carrying the graphic code, and may be, for example, paper printed with a two-dimensional barcode, or a commodity with a barcode.

Existence of the identity marker in the image refers to existence of a portrait of the identity marker in the image. The existence of the identity marker in the image may be existence of at least part of the identity marker in the image. The at least part of the identity marker may be a complete identity marker or a part of the identity marker.

The position information of the identity marker in the image represents a position of a portrait of the identity marker presented in the image relative to the image. The position information of the identity marker in the image is configured for determining a region occupied by the portrait of the identity marker in the image. The position information may be represented by coordinates, or may be represented by a mask image marking a position of an edge of the portrait.

The distance sensor is an electronic device that can measure a distance between a blocking object and the distance sensor. The distance sensor may be an optical distance sensor, an infrared distance sensor, or an ultrasonic distance sensor. Within an effective ranging distance of the distance sensor, a sensing range of the distance sensor is within the viewing angle range of the information acquisition device. The sensing range refers to a range in which the blocking object can be sensed by the distance sensor when the blocking object is at the same distance from the sensor. For ease of description, a quantity of distance sensors of the information acquisition device is represented by N, and N is a positive integer. N may be one or may be greater than one. The blocking object is an entity blocking in the viewing angle range of the information acquisition device. The blocking object may be an entity that is different from an environment within the viewing angle range of the information acquisition device. For example, when the environment is a specific space in a room, the blocking object may be a palm, a face, a finger, a graphic code, or the like that appears in the specific space.

After the information acquisition device acquires the image, the computer device may obtain the image. The computer device may obtain the acquired image instantly after the information acquisition device instantly acquires the image. The computer device may alternatively obtain an image acquired by the information acquisition device in history. The computer device may detect the image acquired by a camera module of the information acquisition device, and determine the position information of the identity marker in the image. The camera module may include at least one camera.

The image may or may not include an identity marker. In some embodiments, the computer device may detect the image acquired by the information acquisition device, and determine whether an identity marker exists in the image. If an identity marker exists in the image, a position of the identity marker in the image is determined, and position information of the identity marker is obtained. If no identity marker exists in the image, it may be determined that the image does not meet a verification condition.

For example, in a palm verification payment scenario, the information acquisition device is a palm information acquisition device, and the identity marker is a palm. If a palm exists in the image, a position of the palm in the image is determined. If no palm exists in the image, it is determined that the image does not meet the verification condition.

In an embodiment, the computer device or the information acquisition device may detect whether a blocking object exists in the image. If a blocking object exists, the computer device or the information acquisition device may further detect whether the blocking object is an identity marker. If no blocking object exists, the computer device or the information acquisition device may determine that no identity marker exists in the image. When the computer device or the information acquisition device detects that the blocking object is an identity marker, the computer device continues to determine position information of the identity marker in the image. When determining that no identity marker exists in the image, the computer device may not perform the following operations.

In some embodiments, the image is acquired when detecting that a blocking object exists within the viewing angle range of the information acquisition device. The computer device or the information acquisition device may detect whether a blocking object exists within the viewing angle range of the information acquisition device. If a blocking object is detected, the information acquisition device then acquires an image. The detection of the blocking object may be implemented through infrared detection, distance sensor detection, or the like.

For example, when the distance sensor senses a distance value between the blocking object and the information acquisition device, the camera module of the information acquisition device acquires an image of the blocking object. The blocking object may be an identity marker or may not be an identity marker.

In an embodiment, the position information of the identity marker in the image may be represented by a position of a bounding box covering the identity marker in the image. The position may uniquely determine a position of the bounding box relative to the image. When the bounding box is a rectangle, the position information may be coordinates of any two diagonal vertices of the bounding box, or may be represented by a width and a height of the bounding box and coordinates of a fixed point of the bounding box. The fixed point is a point whose position is fixed relative to the bounding box, and may be a vertex of the bounding box or a center point of the bounding box.

The region occupied by the identity marker in the image refers to an imaging region of the identity marker in the image. For example, the region occupied by the identity marker in the image may be a region surrounding the identity marker in the bounding box. A shape of the bounding box is not limited in this application. For example, the bounding box may be a rectangle or a circle.

In some embodiments, the bounding box may be completely attached to an edge of the identity marker. For example, for a rectangular bounding box, there may be points respectively around the identity marker that are attached to a boundary of the bounding box. Alternatively, the bounding box may not be completely attached to the edge of the identity marker, that is, there is a gap. In some embodiments, the bounding box may be a smallest rectangular box including the identity marker, or may be a rectangular box including the identity marker and leaving a gap around the identity marker.

For example, when the identity marker is a palm, the bounding box may be completely attached to an edge of the palm, or may leave a gap around the palm. For example, as shown in FIG. 5, the bounding box 510 is a rectangle.

Figure 5:
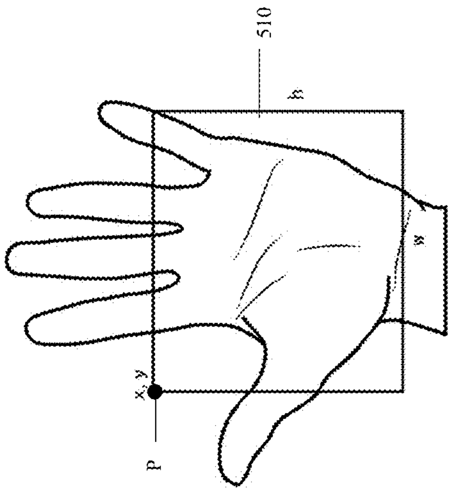
FIG. 5 is a schematic diagram of a bounding box according to an embodiment of this application.

For example, as shown in FIG. 5, the image is an image of a hand, the identity marker is a palm, the region occupied by the identity marker in the image refers to a region within the bounding box 510 of the identity marker, and the position information of the identity marker in the image refers to position information of the bounding box 510, for example, a width w and a height h of the bounding box 510 and coordinates (x, y) of a point P at an upper left corner of the bounding box.

Operation 420. Obtain at least one distance value, and determine, according to the at least one distance value, calibration positions corresponding to a subset of distance sensors in the image, where the at least one distance value is acquired by the subset of distance sensors in the at least one distance sensor and is acquired when the information acquisition device acquires the image, and the subset of distance sensors are at least part of the at least one distance sensor.

The distance sensor, also referred to as a displacement sensor, is a type of sensor configured to sense a distance between the sensor and an object to complete a preset function. A type of the distance sensor is not limited in this application, and may be, for example, an ultrasonic distance sensor, a laser distance sensor, an infrared distance sensor, or the like.

The distance value is a value obtained by acquiring a distance between the distance sensor and the blocking object, which directly reflects the distance between the distance sensor and the blocking object. The distance sensor is fixed on the information acquisition device. Therefore, the distance value can reflect the distance of the blocking object relative to the information acquisition device. When the blocking object is an identity marker, the distance value may reflect a distance between the identity marker and the information acquisition device.

In some embodiments, the distance sensor and the camera module are disposed on the same plane. Therefore, a distance value sensed by the distance sensor to the identity marker can represent not only a distance between the identity marker and the information acquisition device, but also a distance between the identity marker and the camera module.

Because camera imaging follows the rectilinear propagation principle of light, the region occupied by the identity marker in the image follows the rule that everything looks small in the distance and big on the contrary. That is, a smaller distance between the identity marker and the information acquisition device indicates a larger region occupied by the identity marker in the image; and a larger distance between the identity marker and the information acquisition device indicates a smaller region occupied by the identity marker in the image.

Because the position of the distance sensor on the information acquisition device is fixed, a change of the distance between the identity marker and the information acquisition device does not affect a sensing position of the distance sensor. For example, referring to the arrangement of the distance sensor in FIG. 2, when the palm is 5 cm away from the palm information acquisition device, a fingertip of the middle finger is located at a center point of a sensing range of the distance sensor P1. When the palm is translated to a position 15 cm away from the palm information acquisition device along a direction perpendicular to the plane on which the camera module and the distance sensor are located, the fingertip of the middle finger is still located at the center point of the sensing range of the distance sensor P1.

Figure 6:
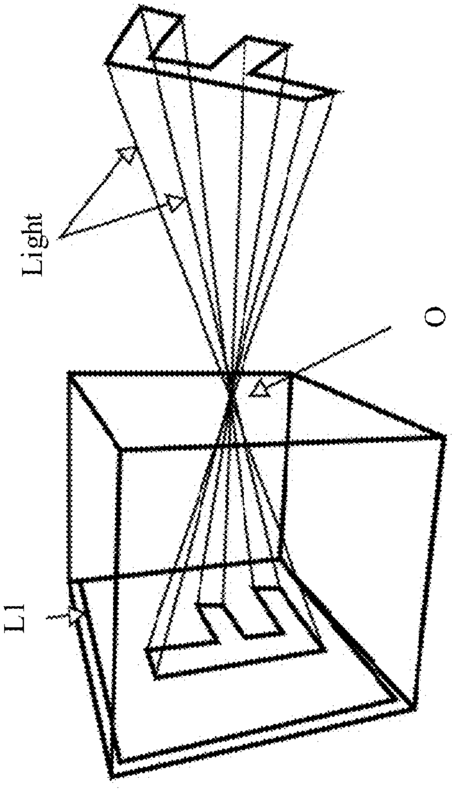
FIG. 6 is a schematic diagram of a camera imaging principle according to an embodiment of this application.
Figure 7:
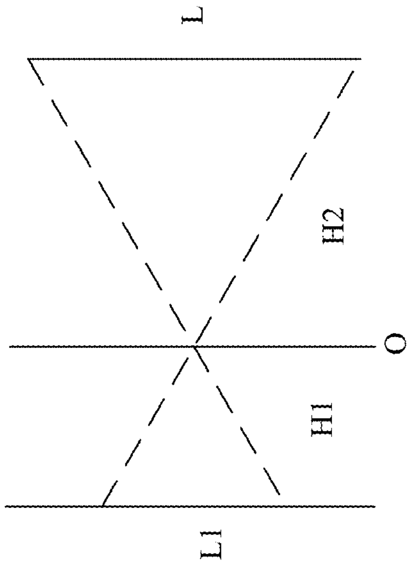
FIG. 7 is a schematic diagram of a camera imaging principle according to another embodiment of this application.

Camera imaging follows the rectilinear propagation principle of light. As shown in FIG. 6, since light is propagated along a straight line, an object F appears as an inverted F on an imaging plane L1 after passing through a lens O. In addition, camera imaging follows the rule that everything looks small in the distance and big on the contrary. As shown in FIG. 7, a distance H1 between the imaging plane L1 and the lens O is fixed, and an imaging size of an object L on the imaging plane L1 is inversely proportional to H2. Therefore, a palm in an image obtained by the camera module acquiring a palm at 5 cm is larger than a palm in an image obtained by acquiring a palm at 15 cm. A calibration position corresponding to the distance sensor P1 on the image obtained by acquiring the palm at 5 cm is a fingertip of the middle finger of the palm in the image; and a calibration position corresponding to the distance sensor on the image obtained by acquiring the palm at 15 cm is also a fingertip of the middle finger of the palm in the image. Therefore, the calibration position corresponding to the distance sensor P1 on the image obtained by acquiring the palm at 5 cm is closer to an outer side of the image, that is, farther away from a center point of the image, than the calibration position corresponding to the distance sensor on the image obtained by acquiring the palm at 15 cm.

That the at least one distance value is acquired by the subset of distance sensors in the at least one distance sensor means that the at least one distance value may be acquired by all distance sensors in the at least one distance sensor, or may be acquired by some distance sensors in the at least one distance sensor.

In an embodiment, the information acquisition device has a plurality of distance sensors. If the blocking object appears in sensing ranges of only some distance sensors of the plurality of distance sensors, the computer device may obtain distance values acquired by some distance sensors, where the some distance sensors are distance sensors that sense the blocking object. If a total quantity of distance sensors of the information acquisition device is N, a quantity of distance sensors that sense the blocking object is n, where both N and n are positive integers, and $N \geq n$.

In an embodiment, at least one distance value is acquired when the information acquisition device acquires the image, and an acquisition moment of the distance value may be the same as an image acquisition moment of the image, or a difference between the two moments is within a preset range.

Each of the distance sensors that sense the blocking object corresponds to a calibration position in the image. The calibration position may represent a distance to the blocking object sensed by the corresponding distance sensor.

A position relationship between the calibration position and the image may represent a distance between the corresponding distance sensor and the blocking object. For the same distance sensor, when the blocking object is closer to the distance sensor, the corresponding calibration position is closer to an edge of the image, that is, away from a center of the image; and when the blocking object is farther away from the distance sensor, the corresponding calibration position is farther away from the edge of the image, that is, closer to the center of the image. In addition, a relative position relationship between different calibration positions may represent an arrangement position relationship between corresponding different distance sensors.

When a blocking object exists in the image, the calibration position reflects a position relationship of the corresponding distance sensor relative to the physical blocking object. When the blocking object is an identity marker, the calibration position reflects a position relationship of the corresponding distance sensor relative to the physical identity marker.

Figure 8:
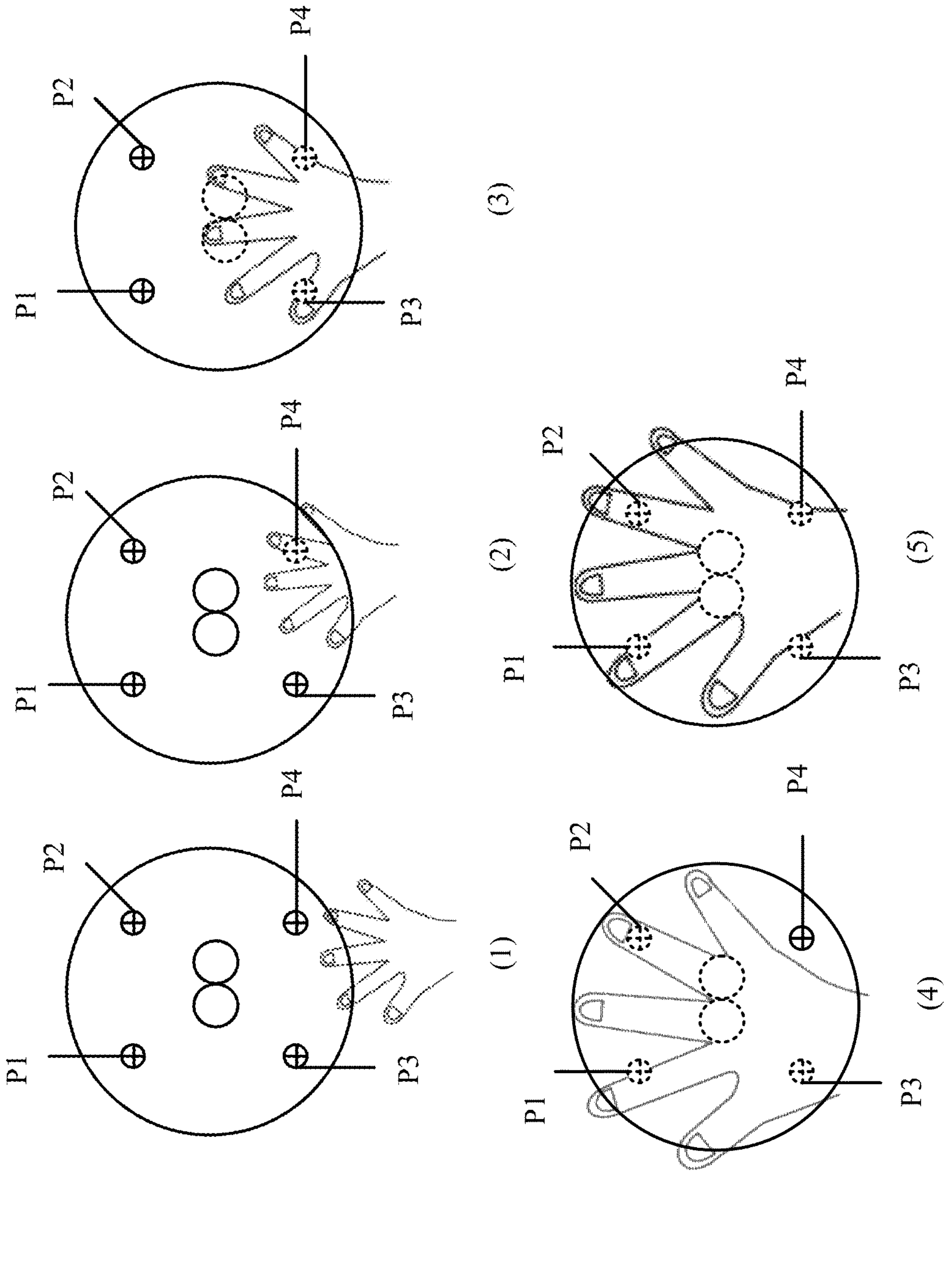
FIG. 8 is a schematic diagram of identity marker distance detection according to an embodiment of this application.

For example, as shown in FIG. 8, the blocking object is an identity marker, the identity marker is a palm, and the information acquisition device is a palm information acquisition device which includes a camera module and four distance sensors (P1, P2, P3, and P4).

As shown in FIG. 8(1), the palm does not appear in sensing ranges of the four distance sensors. Therefore, none of the four distance sensors senses a distance value to the palm.

As shown in FIG. 8(2), the palm only appears in a sensing range of the distance sensor P4. Therefore, only the distance sensor P1 senses a distance value to the palm, and none of the distance sensors P1, P2, and P3 senses a distance value to the palm.

As shown in FIG. 8(3), the palm only appears in sensing ranges of the distance sensors P3 and P4. Therefore, only the distance sensors P3 and P4 sense distance values to the palm, and none of the distance sensors P1 and P2 senses a distance value to the palm.

As shown in FIG. 8(4), the palm appears in sensing ranges of the distance sensors P1, P2, and P3. Therefore, the distance sensors P1, P2, and P3 sense distance values to the palm, and the distance sensor P4 does not sense a distance value to the palm.

As shown in FIG. 8(5), the palm appears in sensing ranges of the distance sensors P1, P2, P3, and P4. Therefore, the distance sensors P1, P2, P3, and P4 all sense distance values to the palm.

Operation 430. Determine, according to the position information and the calibration positions corresponding to the subset of distance sensors in the image, at least one target distance sensor detecting the identity marker in the subset of distance sensors.

The target distance sensor is a distance sensor determining that the identity marker is detected. A subset of distance sensors in the at least one distance sensor sense the blocking object and acquire distance values, and at least one distance sensor in the subset of distance sensors senses the identity marker. The distance sensor that senses the identity marker is referred to as the target distance sensor. If the total quantity of distance sensors of the information acquisition device is N, the quantity of distance sensors that sense the blocking object is n, and a quantity of distance sensors determining that the identity marker is sensed is m, where N, n, and m are all positive integers, and $N \geq n \geq m$.

In some embodiments, in addition to the identity marker, there is another blocking object enabling the distance sensor to sense a distance value. Therefore, a distance sensor whose sensed entity is the identity marker needs to be selected as the target distance sensor.

For example, the identity marker is a palm, and the information acquisition device is a palm information acquisition device. However, the palm is inseparable from fingers. Therefore, there may be a case that a finger appears in the sensing range of the distance sensor, but the palm does not appear in the sensing range of the distance sensor. In this case, a distance value between the finger and the information acquisition device sensed by the distance sensor is not to be configured for evaluating a distance value between the palm and the information acquisition device. Therefore, the distance value sensed by the distance sensor needs to be excluded.

Figure 9:
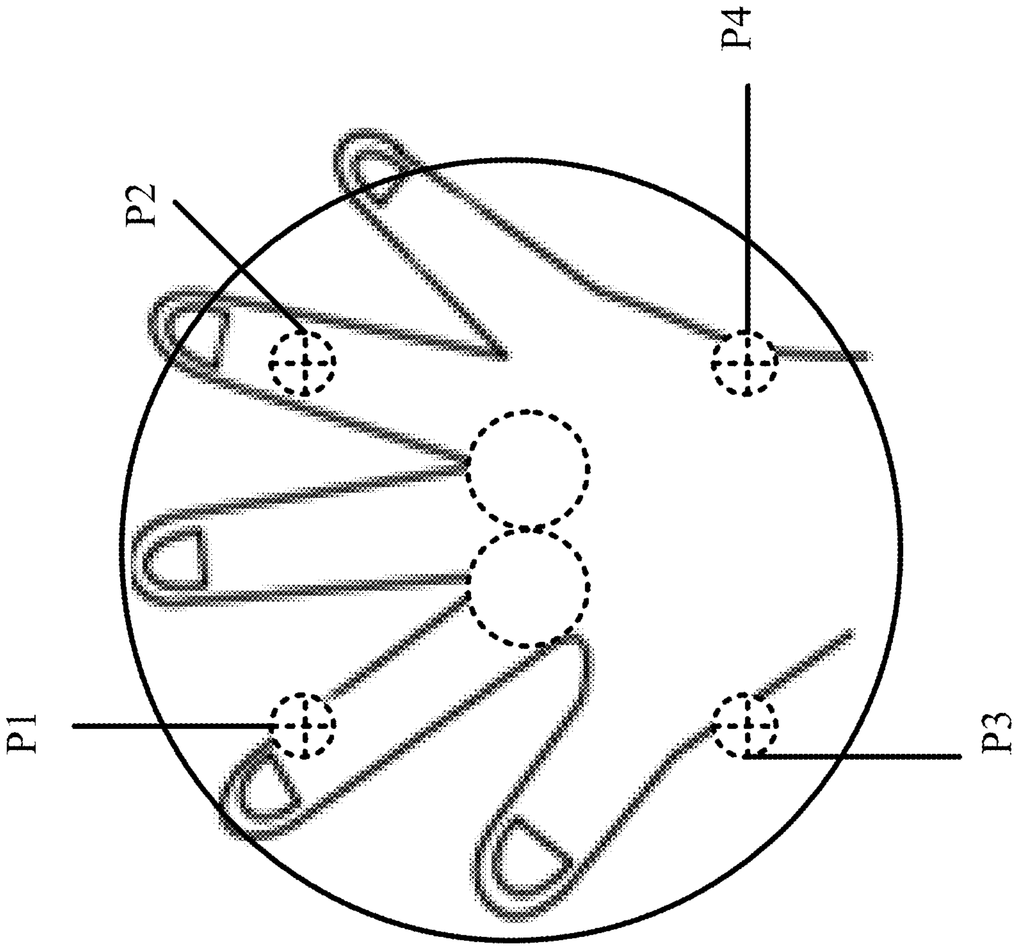
FIG. 9 is a schematic diagram of identity marker distance detection according to another embodiment of this application.

For example, as shown in FIG. 9, the identity marker is a palm, and the information acquisition device is a palm information acquisition device which includes a camera module and four distance sensors (P1, P2, P3, and P4). A palm appears in sensing ranges of the distance sensors P3 and P4, and sensing ranges of P1 and P2 include only fingers. In this case, distance values sensed by P1 and P2 need to be excluded, distance values sensed by P3 and P4 are reserved, and the distance sensors P3 and P4 are used as target distance sensors.

In an embodiment, when a distance value acquired by the at least one target distance sensor detecting the identity marker is selected according to the position information and the calibration positions corresponding to the subset of distance sensors in the image, it is considered that the at least one target distance sensor detecting the identity marker in the subset of distance sensors is determined.

In an embodiment, the computer device may select, according to the position information of the identity marker in the image and the calibration positions respectively corresponding to the subset of distance sensors, a calibration position coinciding with the identity marker in the image, and determine the distance sensor corresponding to the selected calibration position as a target sensor.

Operation 440. Determine a distance between the identity marker and the information acquisition device according to the distance value acquired by the at least one target distance sensor.

In some embodiments, the computer device may determine, according to an average value of the distance values respectively acquired by various target distance sensors, the distance between the identity marker and the information acquisition device. For example, the average value of the distance values respectively acquired by the various target distance sensors is directly used as the distance between the identity marker and the information acquisition device. In this embodiment, by using an average value of a plurality of distance values as a final detected distance, interference of unexpected distance values can be alleviated and occurrence of abnormal distances can be reduced.

In an embodiment, the computer device may exclude some distance values from the distance values acquired by the various target distance sensors, and determine the distance between the identity marker and the information acquisition device according to the remaining distance values. When the distance between the identity marker and the information acquisition device is determined according to the remaining distance values, an average value may be used. The excluded distance values may be at least one of a maximum value or a minimum value, or may be distance values from cluster centers of the distance values acquired by the various target distance sensors.

In some embodiments, the distance between the identity marker and the information acquisition device may be determined according to a mode of the distance values respectively acquired by the various target distance sensors. The mode is a value with the highest appearance frequency in a group of data. For example, the distance values acquired by the four distance sensors are respectively 11 cm, 11 cm, 11 cm, and 20 cm. in this case, the distance between the identity marker and the information acquisition device may be determined according to the mode 11 cm of the distance values respectively acquired by the four target distance sensors.

In some embodiments, the computer device may determine the distance between the identity marker and the information acquisition device according to a form of the identity marker and the distance values respectively acquired by the various target distance sensors.

In some embodiments, a process of determining the average value of the distance values respectively acquired by the plurality of target distance sensors as the distance between the identity marker and the information acquisition device is performed when the identity marker is a complete palm. The distance detection method further includes: when the identity marker is an incomplete palm, determining distance values clustered into a category among the distance values respectively acquired by the plurality of target distance sensors, and determining the distance between the identity marker and the information acquisition device according to the distance values clustered into the category. The distance values clustered into the category configured for determining the distance between the identity marker and the information acquisition device may be an average value or a mode of the distance values clustered into the category.

Clustering may be performed according to distances between the distance values, that is, absolute values of differences between the distance values. For example, the four distance values are respectively 11 cm, 12 cm, 13 cm, and 20 cm. Because 11 cm, 12 cm, and 13 cm are closer to each other, and are farther from 20 cm, 20 cm may be directly excluded. The distance between the palm and the information acquisition device is determined based on 11 cm, 12 cm, and 13 cm. For example, an average value 12 cm of 11 cm, 12 cm, and 13 cm may be taken as the distance between the palm and the information acquisition device.

In some embodiments, a process of determining the average value of the distance values respectively acquired by the plurality of target distance sensors as the distance between the identity marker and the information acquisition device is performed when the identity marker is a complete palm. The distance detection method further includes: when the identity marker is an incomplete palm, determining a mode of the distance values respectively acquired by the plurality of target distance sensors as the distance between the identity marker and the information acquisition device.

For example, the identity marker is a palm, and a form of the palm includes a palm with an intact form and a palm with an incomplete form. A palm with an intact form refers to a palm that is consistent with a standard palm form. A palm with an incomplete form refers to a palm having significant anomalies or defects in form, size, location, or structure, for example, a palm of a user defective by burns.

For example, if the identity marker is a palm, for a palm with an intact form, the distance between the identity marker and the information acquisition device may be determined according to the average value of the distance values respectively acquired by the various target distance sensors; and for a palm with an incomplete form, the distance between the identity marker and the information acquisition device may be determined according to the mode of the distance values respectively acquired by the various target distance sensors.

For identity markers with different forms, different methods are used to determine the distance values, so that distance values with significant errors sensed by distance sensors caused by a non-standard form can be eliminated, so that the detected distance is more accurate. In this way, efficient and accurate verification on the identity marker can be achieved, thereby avoiding repeated verification caused by inaccurate distance detection, and further avoiding a waste of resources caused by repeated verification on the identity marker.

According to the technical solution provided in the embodiments of this application, the target distance sensor detecting the identity marker in the plurality of distance sensors is determined according to the calibration positions corresponding to the plurality of distance sensors of the information acquisition device in the image and the position information of the identity marker in the image, and the distance between the identity marker and the information acquisition device is determined according to the distance value sensed by the target distance sensor. By excluding distance values between non-identity marker and the information acquisition device sensed by the distance sensors, impact of conditions such as differences in size of the identity marker, different poses, image distortion, and the like can be avoided, and the detected distance is more accurate, so that efficient and accurate verification on the identity marker can be implemented, repeated verification caused by inaccurate distance detection is avoided, thereby avoiding a waste of resources caused by repeated verification on the identity marker.

In an embodiment, a distance detection method is provided, including: obtaining a first distance corresponding to a first image, where the first distance is a distance detected for the first image by using the operations of Operation 410 to Operation 440; obtaining a second distance corresponding to a second image, where the second distance is a distance detected for the second image by using the operations of Operation 410 to Operation 440; determining a distance difference between the first distance and the second distance; obtaining a time difference between an image acquisition moment of the first image and an image acquisition moment of the second image; determining a movement speed of an identity marker according to the distance difference and the time difference; and determining whether the identity marker meets a verification condition according to the movement speed.

Figure 10:
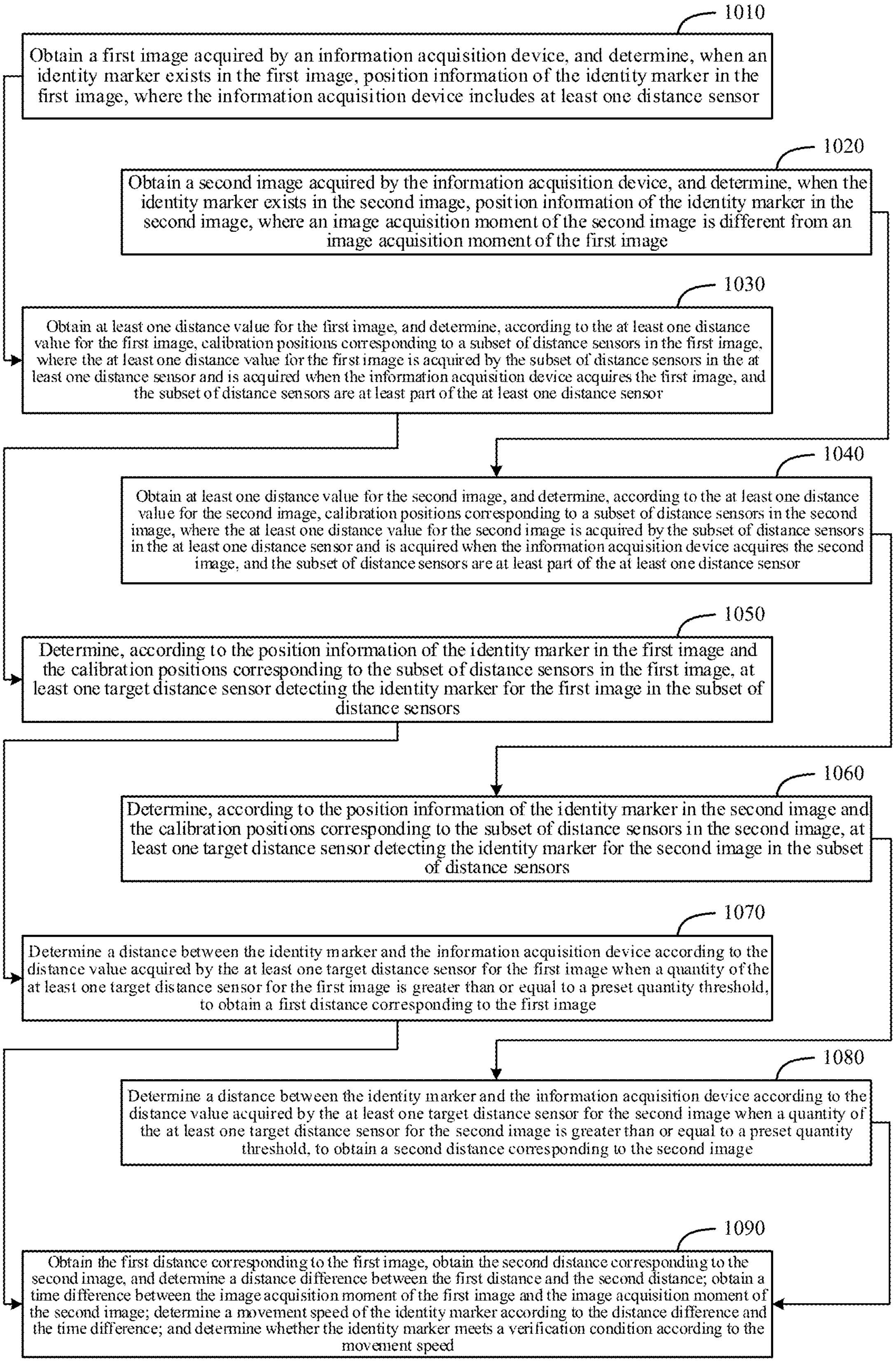
FIG. 10 is a flowchart of a distance detection method according to another embodiment of this application.

To describe the foregoing embodiment more intuitively, FIG. 10 shows a flowchart of a distance detection method according to an embodiment of this application. The method may include at least one operation of Operation 1010 to Operation 1050 below.

Operation 1010. Obtain a first image acquired by an information acquisition device, and determine, when an identity marker exists in the first image, position information of the identity marker in the first image, where the information acquisition device includes at least one distance sensor.

Operation 1020. Obtain a second image acquired by the information acquisition device, and determine, when the identity marker exists in the second image, position information of the identity marker in the second image, where an image acquisition moment of the second image is different from an image acquisition moment of the first image.

The first image and the second image are images respectively acquired by the information acquisition device at different moments. The image acquisition moment of the second image is different from the image acquisition moment of the first image, and the image acquisition moment of the second image may be earlier or later than the image acquisition moment of the first image. Operation 1010 to Operation 1040 are operations of performing the foregoing Operation 410 to Operation 440 on the first image and the second image respectively.

In some embodiments, the computer device may perform, by using a target detection algorithm, target detection on the images acquired by the information acquisition device separately, to determine whether the identity marker exists in the images. If the identity marker exists in an image, position information of the identity marker in the image is determined. The computer device may perform target detection on the first image and the second image separately, or in series or in parallel. When it is determined that the identity marker exists in the first image and the second image, the position information of the identity marker in the first image and the second image is further determined. When the identity marker does not exist in at least one of the first image and the second image, images may continue to be acquired to replace the first image or the second image without the identity marker, and target detection continues to be performed until the identity marker exists in both the latest first image and the latest second image.

A type of the target detection algorithm is not limited in this application. For example, a two-stage algorithm represented by a region convolutional neural network (Faster R-CNN) algorithm may be used, or a one-stage algorithm represented by a single shot multibox detector (SSD) algorithm or you only look once (YOLO) algorithm may be used. The two-stage algorithm is performed in two operations. First, an object region is extracted, and second, convolutional neural network (CNN) classification and recognition is performed on the region. In the one-stage target detection algorithm, feature extraction is performed through a backbone network, and then region regression and target classification are directly performed.

For example, the computer device may use the YOLO algorithm to detect an image acquired by a camera module of the information acquisition device, to determine position information of the identity marker in the image.

Figure 11:
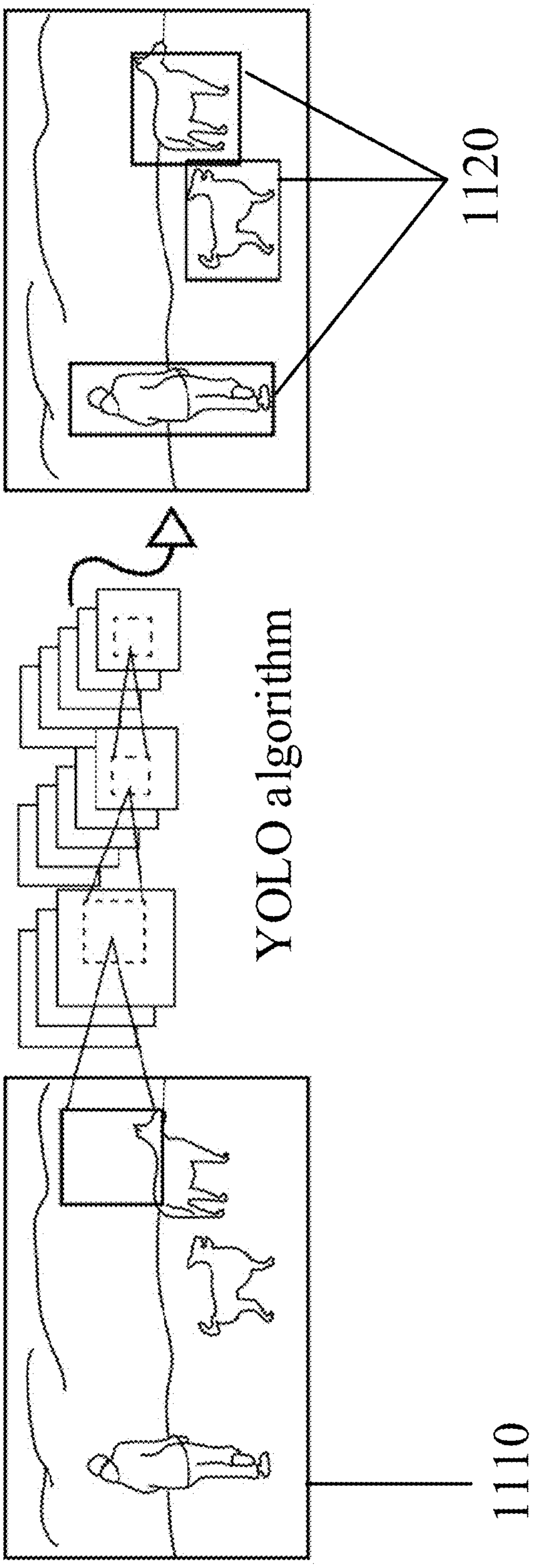
FIG. 11 is a schematic diagram of identity marker position detection according to an embodiment of this application.

For example, as shown in FIG. 11, a YOLO algorithm is used to detect an image 1110 acquired by a camera module of an information acquisition device, to determine position information 1120 of an identity marker in the image.

For example, for an image (the first image or the second image), the image is first divided into S*S grids, also referred to as grid cells, and then B bounding boxes are predicted for each grid cell, where each bounding box includes five predicted values: x, y, w, h, and confidence. x is coordinates of one dimension of a center of the bounding box, y is coordinates of another dimension of the center of the bounding box, w is a width of the bounding box, h is a height of the bounding box, and confidence is a confidence level of the bounding box, that is, a probability that an object within the bounding box belongs to each of a plurality of categories respectively. The category refers to a category of an object in the bounding box. In the embodiments of this application, the category may be set to two categories: an identity marker and a non-identity marker. For example, in a palm verification payment scenario, the categories may be set to two categories: a palm and a non-palm.

Probabilities, that is, confidence levels, of C assumed categories are predicted for each grid cell. A quantity of categories is not limited in this application. For example, the quantity of categories may be the same as categories of PASCAL VOC (a target detection dataset), and C=20 may be used. Based on this, a corresponding confidence level may be obtained for each bounding box. If there is no object in the grid cell, the confidence level is 0. If there is an object in the grid cell, the confidence level is equal to an Intersection over Union (IOU) value of the predicted bounding box and ground truth.

The ground truth refers to accuracy of classification of a supervised learning technology by a training set, and may be understood as a "true value" or a "standard value". In the embodiments of this application, the ground truth may be understood as an annotated bounding box of the identity marker.

The IOU is a standard for measuring the accuracy of detecting a corresponding object in a specific dataset. Any task of obtaining a predicted range (bounding box) in an output can be measured by using the IOU. The IOU is a result obtained by dividing an overlapped part of two regions by a set part of the two regions, and a preset threshold is compared with this IOU calculation result.

Figure 12:
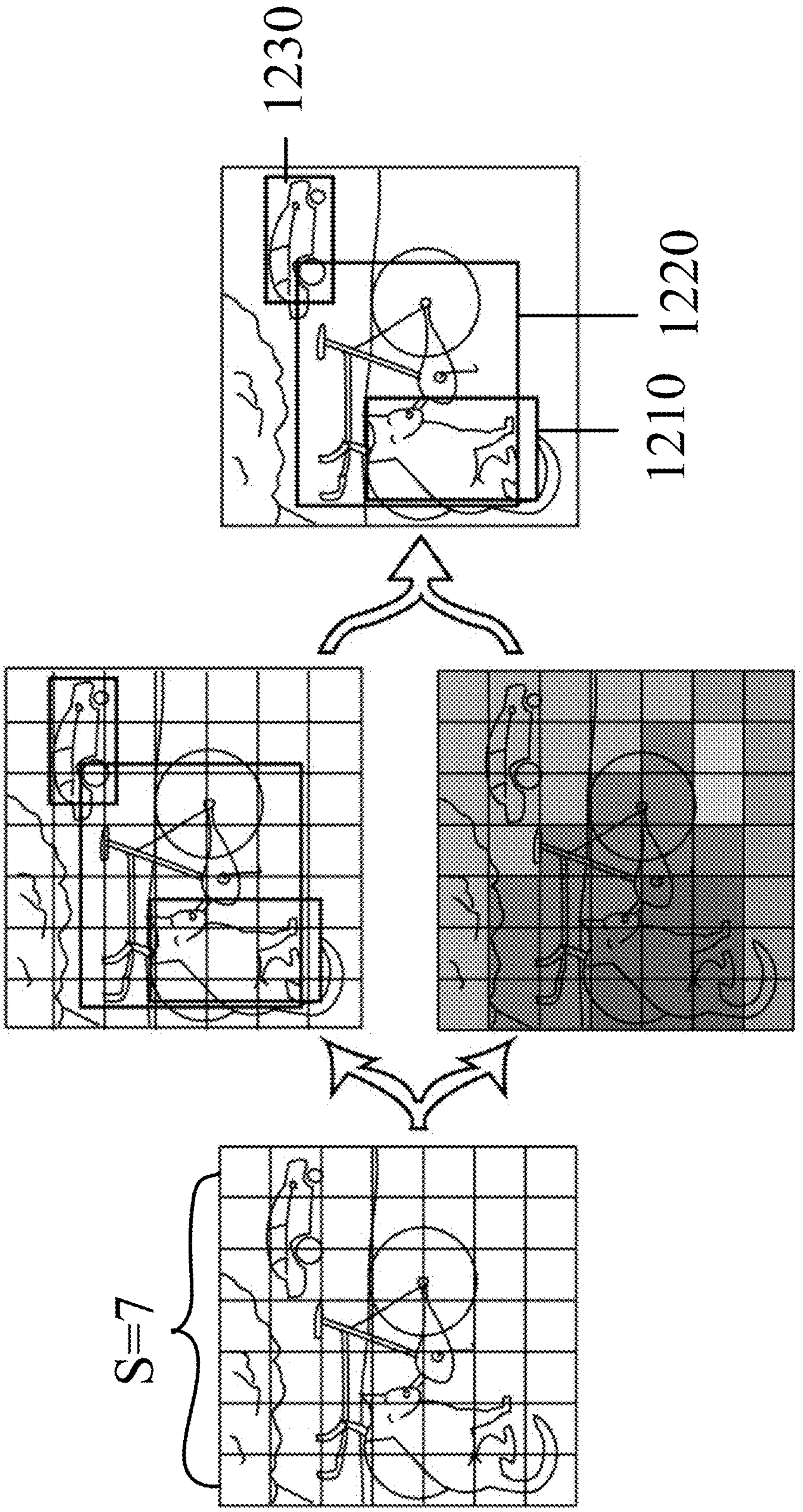
FIG. 12 is a schematic diagram of a YOLO algorithm according to an embodiment of this application.

For example, as shown in FIG. 12, by taking S=7, B=2, and C=20, finally, S×S×(B*5+C)=7*7*30 tensors (that is, a quantity of bounding boxes) may be obtained, and according to confidence levels respectively corresponding to the bounding boxes, a bounding box including three objects (a dog 1210, a bicycle 1220, and a car 1230 in FIG. 12) is obtained.

In the embodiments of this application, the position information of the identity marker in the image is determined through the YOLO algorithm. For example, as shown in FIG. 5, the identity marker is a palm. Through the YOLO algorithm, a width w and a height h of a bounding box 510 and coordinates (x, y) of a point P at an upper left corner of the bounding box are determined.

In some embodiments, the foregoing YOLO algorithm may be implemented by using a neural network, for example, by using a convolutional neural network.

Figure 13:
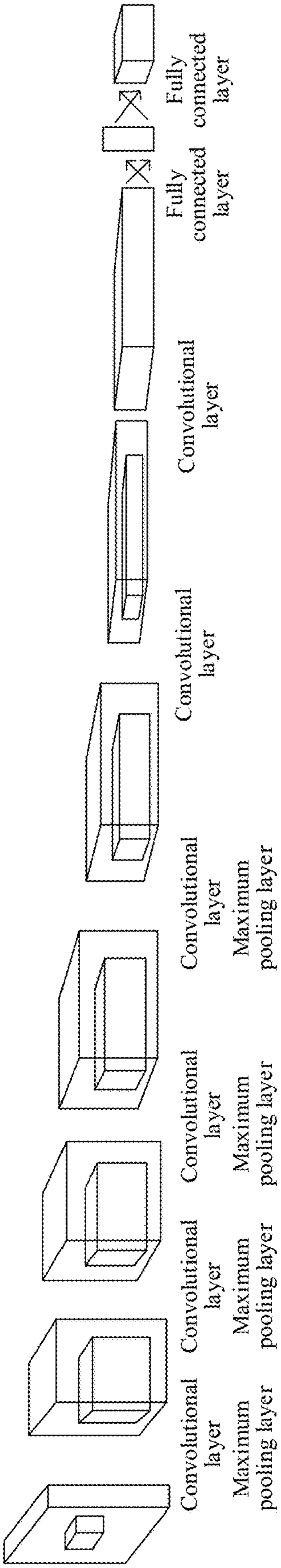
FIG. 13 is a schematic structural diagram of GoogLeNet according to an embodiment of this application.

For example, the foregoing YOLO algorithm may be implemented by using GoogLeNet. As shown in FIG. 13, GoogLeNet includes convolutional layers and fully connected layers. The convolutional layer is configured to extract a feature of the bounding box, and the fully connected layer is configured to predict a confidence level and coordinates of the bounding box. Finally, S×S×(B*5+C) tensors are outputted. In some embodiments, as shown in FIG. 13, GoogLeNet further includes maximum pooling layers. A specific parameter of GoogLeNet is not limited in this application. For example, an image with a specification of 448×448 is inputted, and 7*7*30 tensors are outputted through the six convolutional layers and the two fully connected layers.

Operation 1030. Obtain at least one distance value for the first image, and determine, according to the at least one distance value for the first image, calibration positions corresponding to a subset of distance sensors in the first image, where the at least one distance value for the first image is acquired by the subset of distance sensors in the at least one distance sensor and is acquired when the information acquisition device acquires the first image, and the subset of distance sensors are at least part of the at least distance sensor.

Operation 1040. Obtain at least one distance value for the second image, and determine, according to the at least one distance value for the second image, calibration positions corresponding to a subset of distance sensors in the second image, where the at least one distance value for the second image is acquired by the subset of distance sensors in the at least one distance sensor and is acquired when the information acquisition device acquires the second image, and the subset of distance sensors are at least part of the at least one distance sensor.

Because camera imaging follows the propagation principle of light, a region occupied by the identity marker in the image follows the rule that everything looks small in the distance and big on the contrary. That is, a smaller distance between the identity marker and the information acquisition device indicates a larger region occupied by the identity marker in the image; and on the contrary, a larger distance between the identity marker and the information acquisition device indicates a smaller region occupied by the identity marker in the image. Since the position of the distance sensor on the information acquisition device is fixed, when the distance between the identity marker and the information acquisition device differs, a calibration position corresponding to the distance sensor in the image also differs.

In an embodiment, the information acquisition device includes a camera module for acquiring images, the at least one distance sensor includes a plurality of distance sensors, and the plurality of distance sensors are uniformly distributed with the camera module as a center.

That the plurality of distance sensors are uniformly distributed with the camera module as a center may be that the plurality of distance sensors are arranged in a circle with the camera module as a center of the circle or arranged in a square with the camera module as a center.

Figure 14:
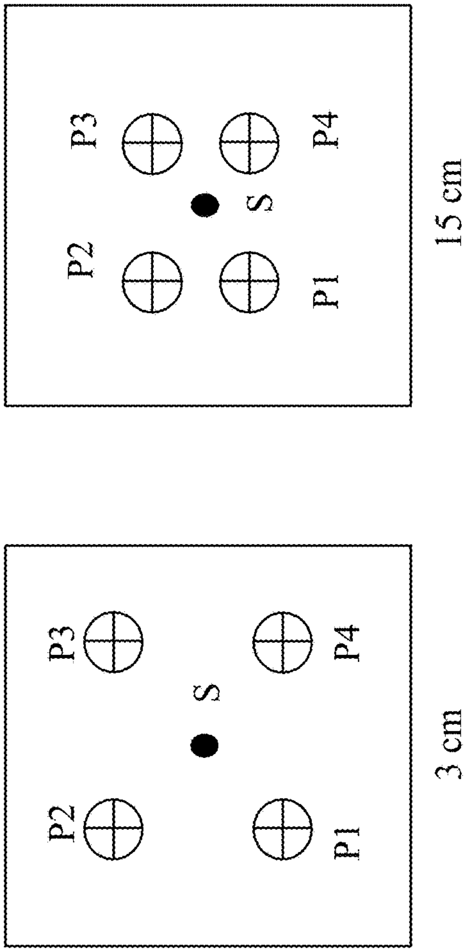
FIG. 14 is a schematic diagram of a mapping relationship between distance values and calibration positions according to an embodiment of this application.

As shown in FIG. 14, the four distance sensors (P1, P2, P3, and P4) are uniformly distributed with the camera module as a center. The calibration positions respectively corresponding to the four distance sensors in the image at positions 15 cm away from the information acquisition device are closer to an image center S than the calibration positions respectively corresponding to the four distance sensors in the image at positions 3 cm away from the information acquisition device.

In this embodiment, the plurality of distance sensors are uniformly distributed with the camera module as a center, so that a position relationship between the distance sensors and the camera module can be closer, and a position relationship between the calibration positions and the identity marker in the image becomes more accurate. Therefore, the distance between the identity marker and the information acquisition device can be determined more accurately, so that verification is more accurate and efficient, and a waste of resources is further avoided.

In an embodiment, determining, according to at least one distance value, calibration positions corresponding to a subset of distance sensors in the image includes: separately determining, for each distance sensor in the subset of distance sensors, the calibration position corresponding to the distance sensor in the image according to the distance value acquired by the distance sensor and a position calibration policy of the distance sensor, where the position calibration policy of the distance sensor is configured for describing a mapping relationship between the distance value acquired by the distance sensor and the calibration position corresponding to the distance sensor. The image may be the first image or the second image.

The computer device may separately determine, for each distance sensor in the subset of distance sensors, the calibration position corresponding to the distance sensor in the first image according to the distance value acquired by the distance sensor for the first image and a position calibration policy of the distance sensor. The computer device may separately determine, for each distance sensor in the subset of distance sensors, the calibration position corresponding to the distance sensor in the second image according to the distance value acquired by the distance sensor for the second image and a position calibration policy of the distance sensor.

In an embodiment, the subset of distance sensors include n distance sensors, n is an integer greater than 1, and the separately determining, for each distance sensor in the subset of distance sensors, the calibration position corresponding to the distance sensor in the image according to the distance value acquired by the distance sensor and a position calibration policy of the distance sensor includes: determining, for an $i^{th}$ distance sensor in the n distance sensors, the calibration position corresponding to the $i^{th}$ distance sensor in the image according to the distance value acquired by the $i^{th}$ distance sensor and the position calibration policy of the $i^{th}$ distance sensor, where i is a positive integer less than or equal to n; and the position calibration policy of the $i^{th}$ distance sensor is configured for describing a mapping relationship between the distance value acquired by the $i^{th}$ distance sensor and the calibration position corresponding to the $i^{th}$ distance sensor.

The position calibration policy of the $i^{th}$ distance sensor may be a conversion relationship between the distance value related to the $i^{th}$ distance sensor and the calibration position, or may be the calibration position corresponding to the distance value related to the $i^{th}$ distance sensor, which is not limited in this application.

In some embodiments, N distance sensors are uniformly distributed with the camera module as a center. If N of the N distance sensors all acquire distance values, n=N. The N distance sensors respectively acquire different distance values, and according to position calibration policies respectively corresponding to the N distance sensors, it may be determined that the obtained calibration positions corresponding to the N distance sensors in the image may be non-uniformly distributed.

Figure 15:
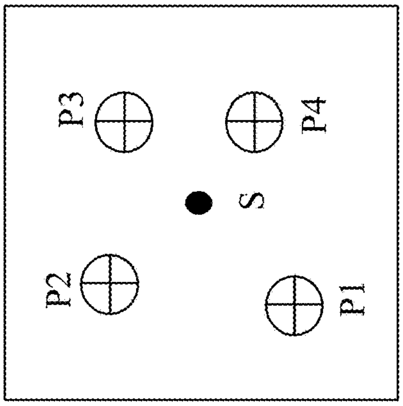
FIG. 15 is a schematic diagram of calibration positions corresponding to distance sensors in an image according to an embodiment of this application.

For example, a distance value acquired by the distance sensor P1 is 10 cm, a distance value acquired by the distance sensor P2 is 13 cm, and distance values acquired by the distance sensors P3 and P4 are both 15 cm. As shown in FIG. 15, it is clear that the calibration positions corresponding to the distance sensors P3 and P4 in the image are closer to the image center S.

In some embodiments, the image is acquired by a camera module of the information acquisition device, and the distance detection method further includes: obtaining a field of view and a focal length of the camera module; determining a position relationship between each distance sensor in the at least one distance sensor and the camera module; separately determining at least two mapping relationships of each distance sensor according to the position relationship between each distance sensor and the camera module, the field of view, and the focal length, where the mapping relationship is a correspondence between the distance value and the calibration position; and determining a position calibration policy of each distance sensor according to the at least two mapping relationships of each distance sensor.

The field of view refers to a maximum viewing angle range of the camera module, and the focal length refers to a distance between an imaging plane corresponding to the camera module and a lens.

In an embodiment, the at least one distance sensor includes N distance sensors, N is a positive integer greater than or equal to n, the image is acquired by a camera module of the information acquisition device, and the method further includes: obtaining a field of view and a focal length of the camera module; determining a position relationship between a $j^{th}$ distance sensor in the N distance sensors and the camera module; determining at least two mapping relationships of the $j^{th}$ distance sensor according to the position relationship between the $j^{th}$ distance sensor and the camera module, the field of view, and the focal length, where the mapping relationship is a correspondence between the distance value and the calibration position; and determining a position calibration policy of the $j^{th}$ distance sensor according to the at least two mapping relationships of the $j^{th}$ distance sensor.

The computer device may obtain the field of view and the focal length corresponding to the camera module; determine at least two mapping relationships between the distance value and the calibration position related to the $j^{th}$ distance sensor according to the field of view, the focal length, and the position relationship between the $j^{th}$ distance sensor and the camera module; and determine the position calibration policy of the $j^{th}$ distance sensor according to the at least two mapping relationships between the distance value and the calibration position related to the $j^{th}$ distance sensor.

For example, according to the field of view, the focal length, and the position relationship between the $j^{th}$ distance sensor and the camera module, a mapping relationship between a first distance value related to the $j^{th}$ distance sensor and a first calibration position and a mapping relationship between a second distance value and a second calibration position are determined; and the position calibration policy of the $j^{th}$ distance sensor is determined according to the mapping relationship between the first distance value and the first calibration position and the mapping relationship between the second distance value and the second calibration position, where the first distance value is different from the second distance value.

Since light follows the rectilinear propagation principle, according to a principle that two points determine a straight line, for the $j^{th}$ distance sensor, by determining the mapping relationships between the two distance values and the calibration positions, the position calibration policy corresponding to the $j^{th}$ distance sensor may be determined.

For any one of the N distance sensors, the position calibration policy of the distance sensor may be determined by using the foregoing method.

Specific values of the first distance value and the second distance value are not limited in this application. For example, the first distance value is 3 cm, and the second distance value is 15 cm.

In some embodiments, when the distance value acquired by the distance sensor is less than a preset distance value, the operation of determining a distance between the identity marker and the information acquisition device according to the distance value acquired by the at least one target distance sensor is performed; and when the distance value acquired by the distance sensor is greater than or equal to the preset distance value, it is determined that the identity marker does not meet the verification condition.

During image acquisition, if the distance values respectively acquired by the distance sensors of the information acquisition device are greater than a preset distance threshold, it is determined that the identity marker does not meet the verification condition. For example, the preset distance threshold is 30 cm. During image acquisition, if the distance values respectively acquired by the distance sensors of the information acquisition device are greater than 30 cm, it is determined that the identity marker does not meet the verification condition.

For example, in a palm verification payment scenario, a palm is used as an identity marker. When a user has willingness to pay, a distance between the palm and a palm information acquisition device does not exceed a specific range (the preset distance threshold). If the palm is detected at a distance exceeding the preset distance threshold, it may be determined that the user does not have willingness to pay.

In some embodiments, during image acquisition, if a smallest distance value among the distance values respectively acquired by the N distance sensors of the information acquisition device is still greater than the preset distance threshold, it is determined that the identity marker does not meet the verification condition. For example, the preset distance threshold is 30 cm, and the distance values respectively acquired by the four distance sensors are 33 cm, 35 cm, 38 cm, and 31 cm. In this case, it is determined that the identity marker does not meet the verification condition. Whether the distance value corresponding to the identity marker is greater than the preset distance threshold is determined according to the smallest distance value, thereby avoiding excessively excluding the identity marker and causing a verification failure.

In some embodiments, during image acquisition, if a distance value greater than the preset distance threshold and a distance value less than the preset distance threshold both exist in the distance values respectively acquired by the N distance sensors of the information acquisition device, and if an average value of the distance values respectively acquired by the N distance sensors of the information acquisition device is greater than the preset distance threshold, it is determined that the identity marker does not meet the verification condition.

For example, the preset distance threshold is 30 cm, and the distance values respectively acquired by the four distance sensors are 33 cm, 35 cm, 38 cm, and 29 cm. In this case, an average value of the distance values acquired by the four distance sensors is 33.75 cm, and is greater than 30 cm. In this case, it may be determined that the identity marker does not meet the verification condition. Whether the identity marker exceeds a range of the preset distance threshold is determined according to the average value of the distance values, thereby avoiding excessively excluding the identity marker and causing a verification failure.

Operation 1050. Determine, according to the position information of the identity marker in the first image and the calibration positions corresponding to the subset of distance sensors in the first image, at least one target distance sensor detecting the identity marker for the first image in the subset of distance sensors.

Operation 1060. Determine, according to the position information of the identity marker in the second image and the calibration positions corresponding to the subset of distance sensors in the second image, at least one target distance sensor detecting the identity marker for the second image in the subset of distance sensors.

In some embodiments, the determining, according to the position information and the calibration positions corresponding to the subset of distance sensors in the image, at least one target distance sensor detecting the identity marker in the subset of distance sensors includes: determining a region occupied by the identity marker in the image according to the position information; selecting at least one calibration position located in the region from the calibration positions corresponding to the subset of distance sensors in the image; and determining each distance sensor corresponding to the selected at least one calibration position as the at least one target distance sensor detecting the identity marker in the subset of distance sensors. The image may be the first image or the second image.

The computer device may determine a region occupied by the identity marker in the first image according to the position information of the identity marker in the first image. The computer device may select at least one calibration position located in the region from the calibration positions corresponding to the subset of distance sensors in the first image, to obtain a calibration position selected for the first image. The computer device may determine each distance sensor corresponding to the calibration position selected for the first image as the at least one target distance sensor detecting the identity marker for the first image.

The computer device may determine a region occupied by the identity marker in the second image according to the position information of the identity marker in the second image. The computer device may select at least one calibration position located in the region from the calibration positions corresponding to the subset of distance sensors in the second image, to obtain a calibration position selected for the second image. The computer device may determine each distance sensor corresponding to the calibration position selected for the second image as the at least one target distance sensor detecting the identity marker for the second image.

In some embodiments, the position information of the identity marker in the image may be position information of a bounding box; and the region occupied by the identity marker in the image may be a region within the bounding box. According to the position information of the bounding box, a position of the bounding box in the image may be determined.

In some embodiments, the computer device may identify the identity marker included in the image to obtain an edge contour of the identity marker, and use a region within the edge contour of the identity marker as the region occupied by the identity marker. A method for determining the edge contour of the identity marker is not limited in this application. For example, edge key points of the identity marker may be determined, and the edge contour of the identity marker is determined according to the edge key points of the identity marker.

For example, the identity marker is a palm. The palm included in the image is identified to determine edge key points of the palm, a closed route is fitted according to the edge key points of the palm as an edge contour of the palm, and a region within the edge contour of the palm is used as a region occupied by the palm. For example, the palm included in the image is identified to determine key points of a palmar edge of the palm and key points of fingers, and a closed route is fitted according to the key points as the edge contour of the palm.

According to the edge contour of the identity marker, the region occupied by the identity marker is determined more precisely, so that the target distance sensor located in the region occupied by the identity marker can be determined more accurately. In this way, efficient and accurate verification on the identity marker can be implemented, repeated verification caused by inaccurate distance detection is avoided, thereby further avoiding a waste of resources caused by repeated verification on the identity marker.

Operation 1070. Determine a distance between the identity marker and the information acquisition device according to the distance value acquired by the at least one target distance sensor for the first image when a quantity of the at least one target distance sensor for the first image is greater than or equal to a preset quantity threshold, to obtain a first distance corresponding to the first image.

Operation 1080. Determine a distance between the identity marker and the information acquisition device according to the distance value acquired by the at least one target distance sensor for the second image when a quantity of the at least one target distance sensor for the second image is greater than or equal to a preset quantity threshold, to obtain a second distance corresponding to the second image.

The computer device may process the first image and the second image respectively by using the foregoing Operation 440, to obtain the first distance corresponding to the first image and the second distance corresponding to the second image.

In an embodiment, when a single target distance sensor exists, the distance value acquired by the single target distance sensor is determined as the distance between the identity marker and the information acquisition device. In this embodiment, although there is only a single target distance sensor, it is reliable with a high efficiency requirement, and still has advantages over a pure visual solution, taking both efficiency and security into account.

In some embodiments, when a plurality of target distance sensors exist, an average value of the distance values respectively acquired by the plurality of target distance sensors is determined as the distance between the identity marker and the information acquisition device.

The average value of the distance values respectively acquired by the plurality of target distance sensors may be obtained by directly dividing a sum of the distance values respectively acquired by the target distance sensors by a total quantity of the target distance sensors, or may be obtained by removing duplicated distance values respectively acquired by the target distance sensors and then calculating an arithmetic average value of the remaining distance values.

For example, the target distance sensors are P1, P2, and P3, a distance value acquired by P1 is z1, a distance value acquired by P2 is z2, and a distance value acquired by P3 is z3. In this case, the distance between the identity marker and the information acquisition device is (z1+z2+z3)/3.

In this embodiment, by using an average value of a plurality of distance values as a final detected distance, interference of unexpected distance values can be alleviated and occurrence of abnormal distances can be reduced.

In some embodiments, the distance detection method further includes: performing, when a quantity of the target distance sensors is greater than or equal to a preset quantity threshold, the operation of determining a distance between the identity marker and the information acquisition device according to the distance value acquired by the at least one target distance sensor.

In some embodiments, following the principle that three points determine a plane, a value of the preset quantity threshold is greater than or equal to 3. A specific value of the preset quantity threshold is not limited in this application, and may be set according to a specific implementation. For example, the information acquisition device includes only four distance sensors, and the value of the preset quantity threshold is set to 3. For example, the information acquisition device includes 10 distance sensors, and the value of the preset quantity threshold is set to 5.

In this embodiment, the subsequent operations can be performed continuously only when the quantity of the target distance sensors is greater than or equal to the preset quantity threshold, and distance detection is then performed, so that the security of the detected distance configured for verification can be ensured.

In an embodiment, the distance detection method further includes: determining that the identity marker does not meet a verification condition when the quantity of the target distance sensors is less than the preset quantity threshold. In this embodiment, when the quantity of the target distance sensors is less than the preset quantity threshold, it is directly determined that the verification condition is not met, and the subsequent operations are no longer performed, which can avoid a waste of resources caused by performing the subsequent operations continuously.

Operation 1090. Obtain the first distance corresponding to the first image, obtain the second distance corresponding to the second image, and determine a distance difference between the first distance and the second distance; obtain a time difference between the image acquisition moment of the first image and the image acquisition moment of the second image; determine a movement speed of the identity marker according to the distance difference and the time difference; and determine whether the identity marker meets a verification condition according to the movement speed.

In a real scene, some interference images may be acquired by the information acquisition device. Therefore, it is necessary to determine whether an image meets a verification condition, and perform a verification operation after the verification condition is met. For example, in palm verification payment, user's payment willingness needs to be determined, and after it is determined that an acquired image is configured for payment, a verification operation is performed.

If the image acquired by the information acquisition device is an interference image, a speed of the identity marker is to be fast without a significant pause. Therefore, the verification condition may be determined according to the speed of the identity marker.

In some embodiments, it is determined that the identity marker meets the verification condition when the movement speed is less than or equal to a preset speed threshold. Alternatively, in an embodiment, it is determined that the identity marker meets the verification condition when the movement speed is less than or equal to a preset speed threshold within preset duration.

Values of the preset speed threshold and the preset duration are not limited in this application. The values may be set according to a specific implementation. For example, the preset speed threshold is 0.01 m/s, and the preset duration is 5 s.

In some embodiments, a start time point of the preset duration may or may not be set. This is not limited in this application.

For example, the start time point of the preset duration may not be set, and for a verification task, if a movement speed of an identity marker in the acquired image is less than or equal to the preset speed threshold within the preset duration, it is determined that the identity marker meets the verification condition. For example, in a verification task, four images T1, T3, T5, and T7 are acquired. If a movement speed obtained according to T3 and T7 is less than the preset speed threshold, and a difference between image acquisition moments of T3 and T7 is greater than the preset duration, it is determined that the identity marker meets the verification condition.

For example, the start time point of the preset duration may be set to an earliest moment in image acquisition moments of images configured for calculating the movement speed. For example, in a verification task, four images T1, T3, T5, and T7 are acquired, and an image acquisition moment of T1 is used as the start time point of the preset duration. If a difference between the image acquisition moments of T1 and T7 is greater than the preset duration, but a movement speed obtained according to T1 and T7 is greater than the preset speed threshold, it is determined that the identity marker does not meet the verification condition.

In some embodiments, the movement speed is less than the preset speed threshold within the preset duration. The movement speed may be an average speed of the identity marker within the preset duration, or may be an instantaneous speed of the identity marker within the preset duration. For example, a plurality of images are acquired within the preset duration, where a speed of the identity marker determined according to two consecutive images is used as the instantaneous speed of the identity marker within the preset duration. If instantaneous speeds of the identity marker within the preset duration are all less than the preset speed threshold, it is determined that the identity marker meets the verification condition.

If the identity marker meets the verification condition, a verification operation is started. For example, in a palm verification payment scenario, if the palm meets the verification condition, a palm print of the palm is retrieved, to further complete a payment process.

If the identity marker does not meet the verification condition, it is prompted that verification fails, or it is prompted that the identity marker is not obtained. For example, in human face-based permission recognition, it is prompted that a human face is not recognized.

Whether the identity marker meets the verification condition is determined according to the movement speed, thereby avoiding verification on an identity marker without verification willingness and saving resources consumed for verification.

In some embodiments, when the first image is acquired, the verification operation may be started synchronously. If the identity marker meets the verification condition, a verification result is directly called. If the identity marker does not meet the verification condition, it is considered that the verification fails. Through the foregoing method, the verification process and determination of the verification condition are synchronously performed, which can save time required for processing the identity marker.

In some embodiments, after the determination of the verification condition is completed, if the identity marker meets the verification condition, the verification operation may be started. If the identity marker does not meet the verification condition, it is considered that the verification fails. Through the foregoing method, after the determination of the verification condition is completed, it is further determined whether to start the verification, thereby avoiding performing a verification operation that is not necessarily performed, and further saving resources required for performing the verification operation.

According to the technical solution provided in the embodiments of this application, the target distance sensor detecting the identity marker in the plurality of distance sensors is determined according to the calibration positions corresponding to the plurality of distance sensors of the information acquisition device in the image and the position information of the identity marker in the image, and the distance between the identity marker and the information acquisition device is determined according to the distance value sensed by the target distance sensor. The movement speed of the identity marker is determined according to the distance between the identity marker and the information acquisition device, and whether the identity marker meets the verification condition is determined according to the movement speed of the identity marker. The distance value between a non-identity marker and the information acquisition device sensed by the distance sensor is excluded, and the distance value of the identity marker is determined according to the position calibration policy corresponding to the distance sensor. In this way, there is no need to calibrate the camera, and the solution can be implemented more simply. Impact of conditions such as differences in size of the identity marker, different poses, image distortion, and the like can be avoided, the detected distance is more accurate, and the movement speed is also more accurate, so that efficient and accurate verification on the identity marker can be implemented, repeated verification caused by inaccurate distance detection is avoided, thereby further avoiding a waste of resources caused by repeated verification on the identity marker.

Figure 16:
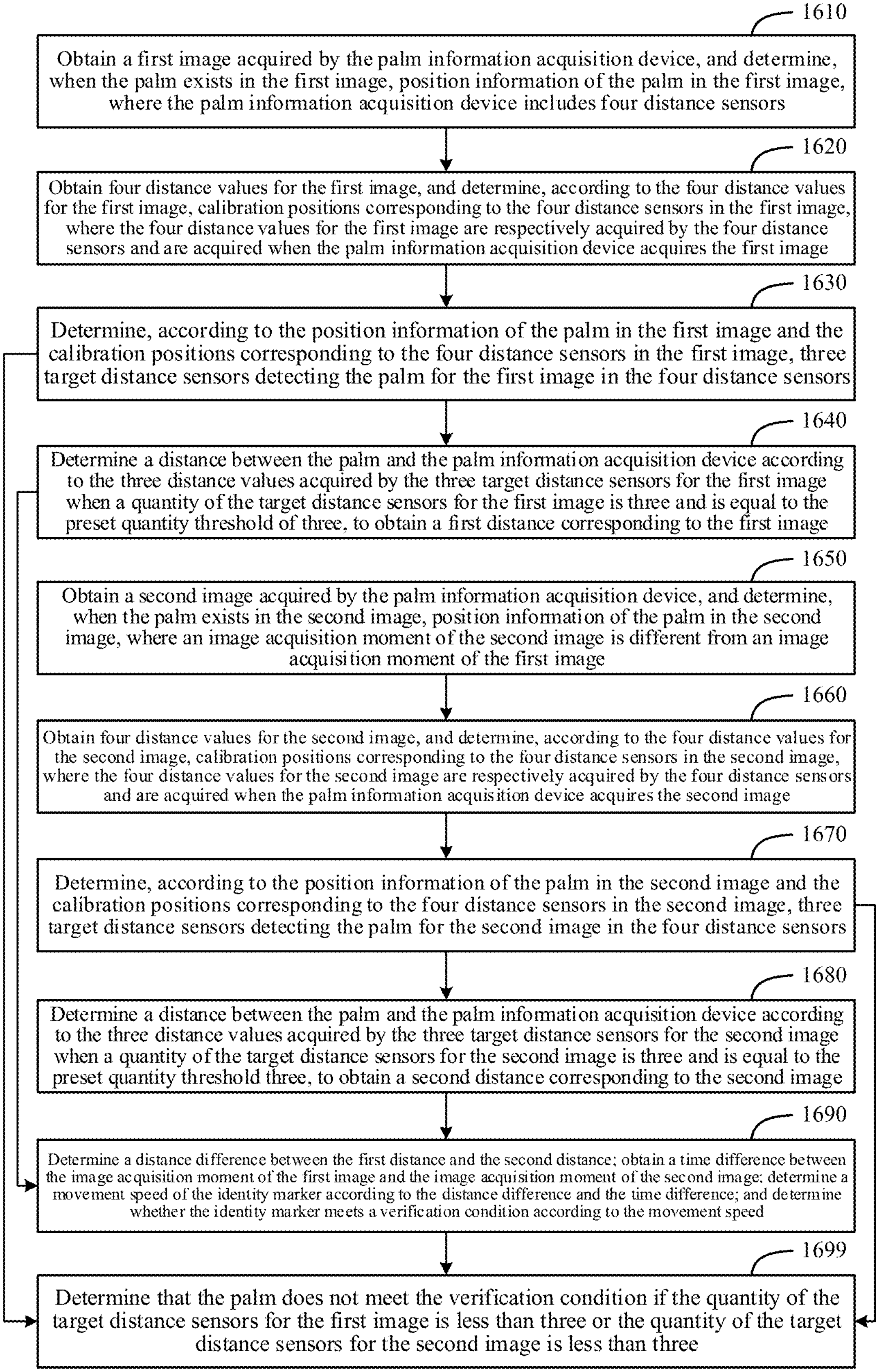
FIG. 16 is a flowchart of a distance detection method according to another embodiment of this application.

FIG. 16 is a flowchart of a distance detection method according to another embodiment of this application. An example in which an application scenario is palm verification payment is used. In this application scenario, an information acquisition device is a palm information acquisition device, the palm information acquisition device includes four distance sensors, a preset quantity threshold is three, and an identity marker is a palm. The method may include at least one of the following Operation 1610 to Operation 1650.

Operation 1610. Obtain a first image acquired by the palm information acquisition device, and determine, when the palm exists in the first image, position information of the palm in the first image, where the palm information acquisition device includes four distance sensors.

Operation 1620. Obtain four distance values for the first image, and determine, according to the four distance values for the first image, calibration positions corresponding to the four distance sensors in the first image, where the four distance values for the first image are respectively acquired by the four distance sensors and are acquired when the palm information acquisition device acquires the first image.

Operation 1630. Determine, according to the position information of the palm in the first image and the calibration positions corresponding to the four distance sensors in the first image, three target distance sensors detecting the palm for the first image in the four distance sensors. Further, whether a quantity of the target distance sensors for the first image is greater than or equal to the preset quantity threshold is determined. If the quantity of the target distance sensors for the first image is greater than or equal to the preset quantity threshold of three, Operation 1640 is performed. If the quantity of the target distance sensors for the first image is less than the preset quantity threshold of three, Operation 1699 is performed.

Operation 1640. Determine a distance between the palm and the palm information acquisition device according to the three distance values acquired by the three target distance sensors for the first image when a quantity of the target distance sensors for the first image is three and is equal to the preset quantity threshold of three, to obtain a first distance corresponding to the first image.

Operation 1650. Obtain a second image acquired by the palm information acquisition device, and determine, when the palm exists in the second image, position information of the palm in the second image, where an image acquisition moment of the second image is different from an image acquisition moment of the first image.

Operation 1660. Obtain four distance values for the second image, and determine, according to the four distance values for the second image, calibration positions corresponding to the four distance sensors in the second image, where the four distance values for the second image are respectively acquired by the four distance sensors and are acquired when the palm information acquisition device acquires the second image.

Operation 1670. Determine, according to the position information of the palm in the second image and the calibration positions corresponding to the four distance sensors in the second image, three target distance sensors detecting the palm for the second image in the four distance sensors. Further, whether a quantity of the target distance sensors for the second image is greater than or equal to the preset quantity threshold is determined. If the quantity of the target distance sensors for the second image is greater than or equal to the preset quantity threshold of three, Operation 1680 is performed. If the quantity of the target distance sensors for the second image is less than the preset quantity threshold of three, Operation 1699 is performed.

Operation 1680. Determine a distance between the palm and the palm information acquisition device according to the three distance values acquired by the three target distance sensors for the second image when a quantity of the target distance sensors for the second image is three and is equal to the preset quantity threshold of three, to obtain a second distance corresponding to the second image.

Operation 1690. Determine a distance difference between the first distance and the second distance; obtain a time difference between the image acquisition moment of the first image and the image acquisition moment of the second image; determine a movement speed of the identity marker according to the distance difference and the time difference; and determine whether the identity marker meets a verification condition according to the movement speed.

Operation 1699. Determine that the palm does not meet the verification condition if the quantity of the target distance sensors for the first image is less than three or the quantity of the target distance sensors for the second image is less than three.

For example, if the movement speed meets the verification condition, the first image or the second image is configured for palm verification in the palm verification payment. If the movement speed does not meet the verification condition, palm verification is not performed.

According to the technical solutions provided in the embodiments of this application, the target distance sensor is determined according to the calibration positions corresponding to the distance sensors in the image and the position information of the palm in the image, and the distance value between the palm and the palm information acquisition device is determined according to the distance value sensed by the target distance sensor. The movement speed of the palm is determined according to the distance value between the palm and the palm information acquisition device, and whether the identity marker meets the verification condition is determined according to the movement speed of the palm. Impact of another object other than a palm on the distance sensors is excluded. In this way, there is no need to calibrate the camera, and impact of conditions such as differences in size of the palm, different poses, image distortion, and the like can be avoided, so that the detected distance is more accurate, and the movement speed is also more accurate. Therefore, the user's payment willingness can be effectively determined, and palm print recognition on a palm without payment willingness is avoided, so that efficient and accurate verification on the identity marker can be implemented, repeated verification caused by inaccurate distance detection is avoided, thereby further avoiding a waste of resources caused by repeated verification on the identity marker.

Apparatus embodiments of this application are described below, and may be configured for performing the method embodiments of this application. For details not disclosed in the apparatus embodiments of this application, reference may be made to the method embodiments of this application.

Figure 17:
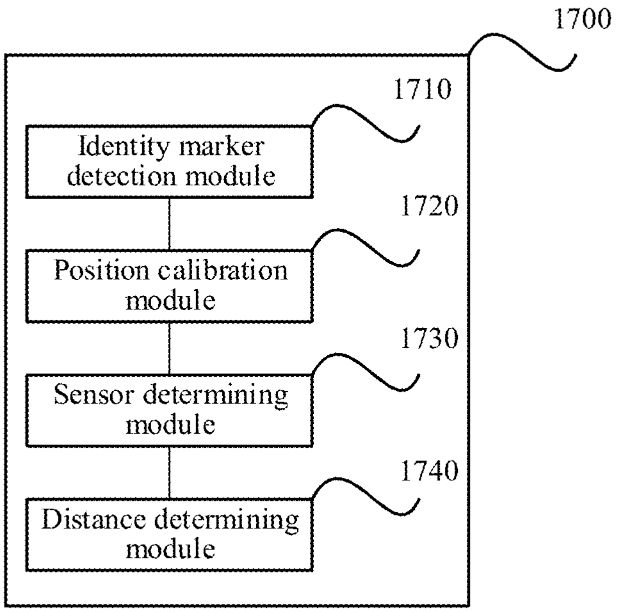
FIG. 17 is a block diagram of a distance detection apparatus according to an embodiment of this application.
Figure 18:
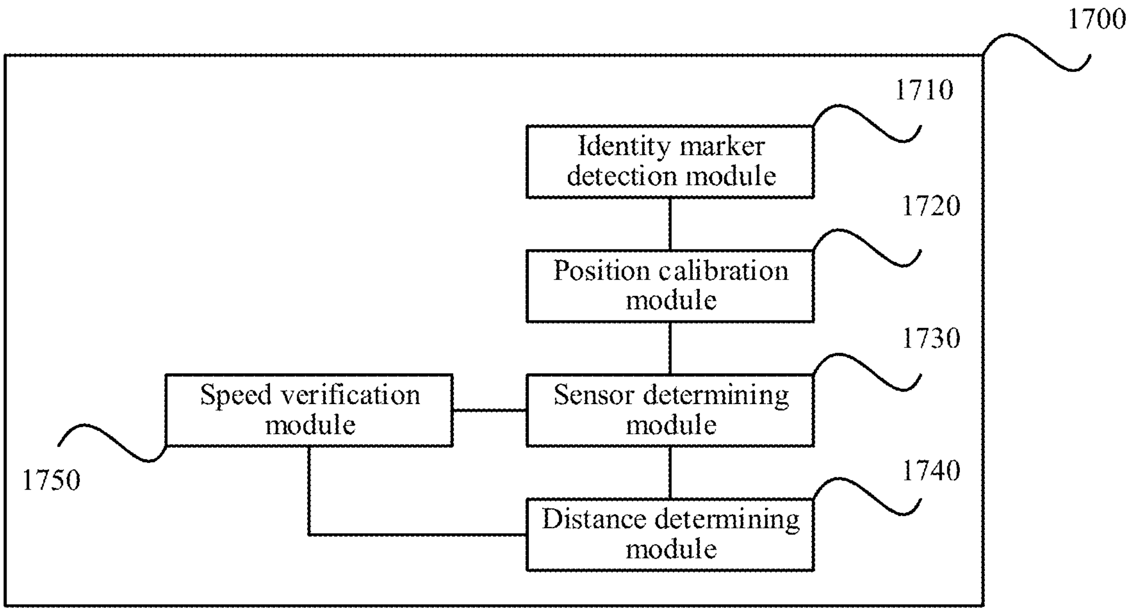
FIG. 18 is a block diagram of a distance detection apparatus according to another embodiment of this application.

FIG. 17 is a block diagram of a distance detection apparatus according to an embodiment of this application. The apparatus has a function of implementing the foregoing distance detection methods, the function may be implemented by hardware or may be implemented by hardware executing corresponding software. The apparatus may be a computer device or may be disposed in a computer device. The apparatus 1700 may include: an identity marker detection module 1710, a position calibration module 1720, a sensor determining module 1730, and a distance determining module 1740.

The identity marker detection module 1710 is configured to: obtain an image acquired by an information acquisition device, and determine, when an identity marker exists in the image, position information of the identity marker in the image, where the information acquisition device includes at least one distance sensor.

The position calibration module 1720 is configured to: obtain at least one distance value, and determine, according to the at least one distance value, calibration positions corresponding to a subset of distance sensors in the image, where the at least one distance value is acquired by the subset of distance sensors in the at least one distance sensor and is acquired when the information acquisition device acquires the image, and the subset of distance sensors are at least part of the at least one distance sensor.

The sensor determining module 1730 is configured to determine, according to the position information and the calibration positions corresponding to the subset of distance sensors in the image, at least one target distance sensor detecting the identity marker in the subset of distance sensors.

The distance determining module 1740 is configured to determine a distance between the identity marker and the information acquisition device according to the distance value acquired by the at least one target distance sensor.

In some embodiments, the position calibration module 1720 is further configured to separately determine, for each distance sensor in the subset of distance sensors, the calibration position corresponding to the distance sensor in the image according to the distance value acquired by the distance sensor and a position calibration policy of the distance sensor, where the position calibration policy of the distance sensor is configured for describing a mapping relationship between the distance value acquired by the distance sensor and the calibration position corresponding to the distance sensor.

In some embodiments, the image is acquired by a camera module of the information acquisition device, and the position calibration module 1720 is further configured to: obtain a field of view and a focal length of the camera module; determine a position relationship between each distance sensor in the at least one distance sensor and the camera module; separately determine at least two mapping relationships of each distance sensor according to the position relationship between each distance sensor and the camera module, the field of view, and the focal length, where the mapping relationship is a correspondence between the distance value and the calibration position; and determine a position calibration policy of each distance sensor according to the at least two mapping relationships of each distance sensor.

In some embodiments, the subset of distance sensors include n distance sensors, n is an integer greater than 1, and the position calibration module 1720 is further configured to determine, for an $i^{th}$ distance sensor in the n distance sensors, the calibration position corresponding to the $i^{th}$ distance sensor in the image according to the distance value acquired by the $i^{th}$ distance sensor and the position calibration policy of the $i^{th}$ distance sensor, where i is a positive integer less than or equal to n; and the position calibration policy of the $i^{th}$ distance sensor is configured for describing a mapping relationship between the distance value acquired by the $i^{th}$ distance sensor and the calibration position corresponding to the $i^{th}$ distance sensor.

In some embodiments, the at least one distance sensor includes N distance sensors, N is a positive integer greater than or equal to n, the image is acquired by a camera module of the information acquisition device, and the position calibration module 1720 is further configured to: obtain a field of view and a focal length of the camera module; determine a position relationship between a $j^{th}$ distance sensor in the N distance sensors and the camera module; determine at least two mapping relationships of the $j^{th}$ distance sensor according to the position relationship between the $j^{th}$ distance sensor and the camera module, the field of view, and the focal length, where the mapping relationship is a correspondence between the distance value and the calibration position; and determine a position calibration policy of the $j^{th}$ distance sensor according to the at least two mapping relationships of the $j^{th}$ distance sensor.

In some embodiments, the sensor determining module 1730 is further configured to: determine a region occupied by the identity marker in the image according to the position information; select at least one calibration position located in the region from the calibration positions corresponding to the subset of distance sensors in the image; and determine each distance sensor corresponding to the selected at least one calibration position as the at least one target distance sensor detecting the identity marker in the subset of distance sensors.

In some embodiments, the distance determining module 1740 is further configured to determine, when a plurality of target distance sensors exist, an average value of the distance values respectively acquired by the plurality of target distance sensors as the distance between the identity marker and the information acquisition device.

In some embodiments, the distance determining module 1740 is further configured to determine, when a plurality of target distance sensors exist and the identity marker is a complete palm, an average value of the distance values respectively acquired by the plurality of target distance sensors as the distance between the identity marker and the information acquisition device.

In some embodiments, the distance determining module 1740 is further configured to: when a plurality of target distance sensors exist and the identity marker is an incomplete palm, determine distance values clustered into a category among the distance values respectively acquired by the plurality of target distance sensors, and determine the distance between the identity marker and the information acquisition device according to the distance values clustered into the category.

In some embodiments, the distance determining module 1740 is further configured to: when a plurality of target distance sensors exist and the identity marker is an incomplete palm, determine a mode of the distance values respectively acquired by the plurality of target distance sensors as the distance between the identity marker and the information acquisition device.

In some embodiments, the distance determining module 1740 is further configured to determine, when a single target distance sensor exists, the distance value acquired by the single target distance sensor as the distance between the identity marker and the information acquisition device.

In some embodiments, the distance determining module 1740 is further configured to determine, when a quantity of the target distance sensors is greater than or equal to a preset quantity threshold, the distance between the identity marker and the information acquisition device according to the distance value acquired by the at least one target distance sensor.

In some embodiments, the distance determining module 1740 is further configured to determine that the identity marker does not meet a verification condition when the quantity of the target distance sensors is less than the preset quantity threshold.

In some embodiments, the apparatus 1700 further includes: a speed verification module, configured to: obtain a first distance corresponding to a first image; obtain a second distance corresponding to a second image; determine a distance difference between the first distance and the second distance; obtain a time difference between an image acquisition moment of the first image and an image acquisition moment of the second image; determine a movement speed of the identity marker according to the distance difference and the time difference; and determine whether the identity marker meets a verification condition according to the movement speed. The first distance is a distance detected for the first image by using the distance detection method in the embodiments of this application; the second distance is a distance detected for the second image by using the distance detection method in the embodiments of this application; and the image acquisition moment of the second image is different from the image acquisition moment of the first image.

In some embodiments, the speed verification module is further configured to determine that the identity marker meets the verification condition when the movement speed is less than or equal to a preset speed threshold.

In some embodiments, the speed verification module is further configured determine that the identity marker meets the verification condition when the movement speed is less than or equal to a preset speed threshold within preset duration.

In some embodiments, the information acquisition device includes a camera module for acquiring images, the at least one distance sensor includes a plurality of distance sensors, and the plurality of distance sensors are uniformly distributed with the camera module as a center.

According to the technical solution provided in the embodiments of this application, the target distance sensor detecting the identity marker in the plurality of distance sensors is determined according to the calibration positions corresponding to the plurality of distance sensors of the information acquisition device in the image and the position information of the identity marker in the image, and the distance between the identity marker and the information acquisition device is determined according to the distance value sensed by the target distance sensor. By excluding distance values between non-identity marker and the information acquisition device sensed by the distance sensors, impact of conditions such as differences in size of the identity marker, different poses, image distortion, and the like can be avoided, and the detected distance is more accurate.

When the apparatus provided in the foregoing embodiment implements the functions of the apparatus, only division of the foregoing functional modules is used as an example for description. In an actual application, the functions may be allocated to and completed by different functional modules according to requirements. That is, an internal structure of the device is divided into different functional modules, to complete all or some of the functions described above. In addition, the apparatus provided in the foregoing embodiments and the method embodiments belong to the same concept. For details of a specific implementation process, reference may be made to the method embodiments. Details are not described herein again.

Figure 19:
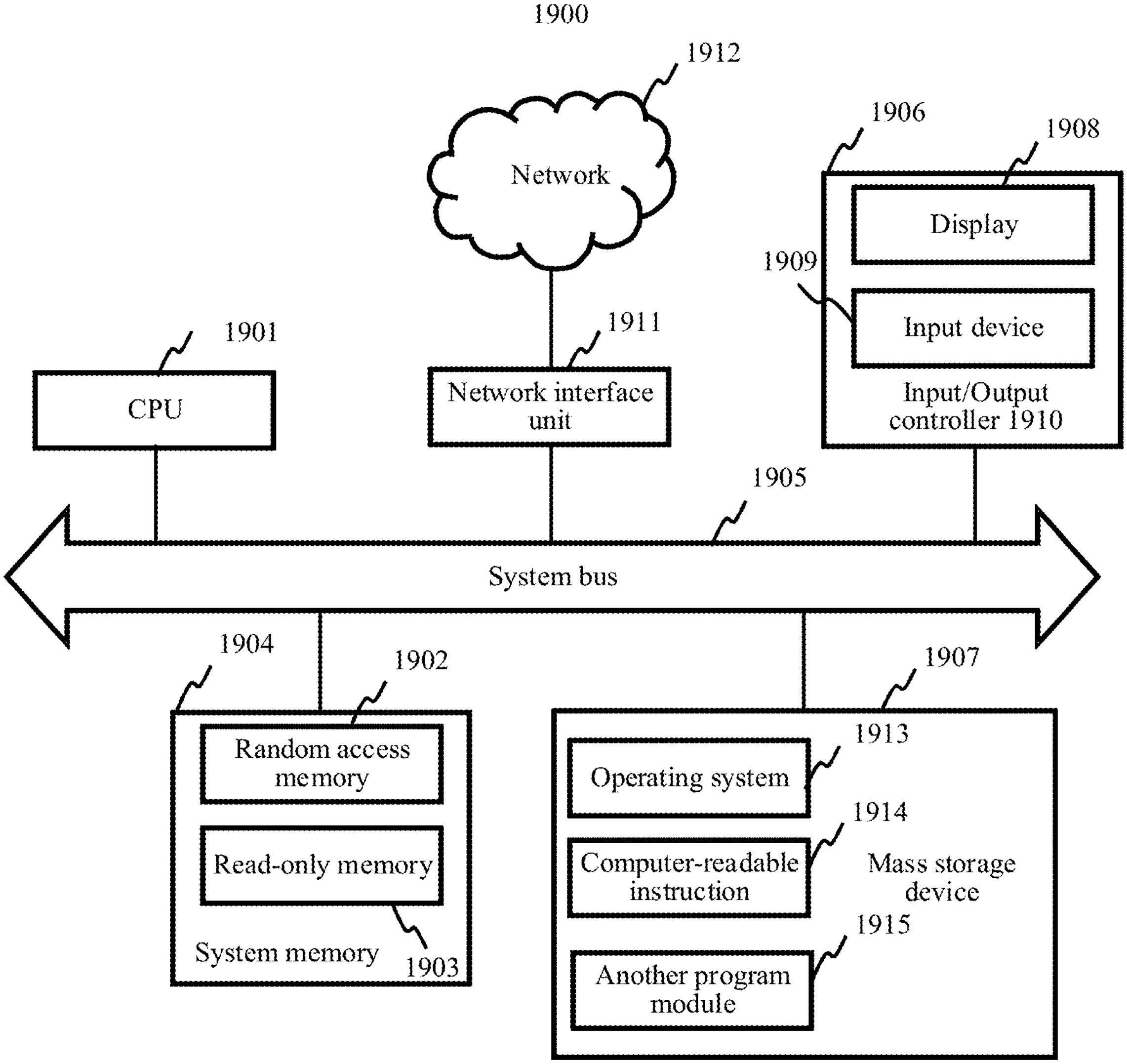
FIG. 19 is a structural block diagram of a computer device according to an embodiment of this application.

FIG. 19 is a schematic structural diagram of a computer device according to an embodiment of this application. The computer device may be any electronic device having data computing, processing, and storage functions. The computer device may be configured to implement the distance detection method provided in the foregoing embodiments. Specifically:

The computer device 1900 includes a central processing unit (for example, a CPU, a graphics processing unit (GPU), and a field programmable gate array (FPGA)) 1901, a system memory 1904 including a random access memory (RAM) 1902 and a read-only memory (ROM) 1903, and a system bus 1905 connecting the system memory 1904 and the CPU 1901. The computer device 1900 further includes a basic input/output (I/O) system 1906 helping transmit information between components in a server and a mass storage device 1907 configured to store an operating system 1913, an application program 1914, and another program module 1911.

In some embodiments, the basic I/O system 1906 includes a display 1908 configured to display information and an input device 1909, such as a mouse or a keyboard, configured to input information by a user. The display 1908 and the input device 1909 are both connected to the CPU 1901 by using an input/output controller 1910 connected to the system bus 1905. The basic I/O system 1906 may further include the input/output controller 1910 to receive and process inputs from a plurality of other devices such as a keyboard, a mouse, and an electronic stylus. Similarly, the input/output controller 1910 further provides an output to a display screen, a printer, or another type of output device.

The mass storage device 1907 is connected to the CPU 1901 by using a mass storage controller (not shown) connected to the system bus 1905. The mass storage device 1907 and an associated computer-readable medium provide non-volatile storage for the computer device 1900. That is, the mass storage device 1907 may include a computer-readable medium (not shown) such as a hard disk or a compact disc ROM (CD-ROM) drive.

Generally, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital video disc (DVD) or another optical memory, a tape cartridge, a magnetic tape, a magnetic disk memory, or another magnetic storage device. Certainly, a person skilled in art can know that the computer storage medium is not limited to the foregoing several types. The system memory 1904 and the mass storage device 1907 may be collectively referred to as a memory.

According to the embodiments of this application, the computer device 1900 may further be connected, through a network such as the Internet, to a remote computer on the network and run. That is, the computer device 1900 may be connected to a network 1912 by using a network interface unit 1911 connected to the system bus 1905, or may be connected to another type of network or a remote computer system (not shown) by using a network interface unit 1911.

The memory stores computer-readable instructions, and the computer-readable instructions are loaded and executed by a processor to implement the foregoing distance detection method.

In an exemplary embodiment, a non-transitory computer-readable storage medium is further provided. The computer-readable storage medium stores computer-readable instructions, and the computer-readable instructions are loaded and executed by a processor to implement the foregoing distance detection method.

In some embodiments, the computer-readable storage medium may include a ROM, a RAM, a solid-state drive (SSD), an optical disc, or the like. The RAM may include a resistance RAM (ReRAM) and a dynamic RAM (DRAM).

In an exemplary embodiment, a computer program product is further provided. The computer program product includes computer-readable instructions, the computer-readable instructions are stored in a computer-readable storage medium, and a processor reads the computer-readable instructions from the computer-readable storage medium and executes the computer-readable instructions, to implement the foregoing distance detection method.

Information (including but not limited to user device information, user personal information, or the like), data (including but not limited to data configured for analysis, stored data, presented data, or the like), and signals involved in this application are all authorized by a user or fully authorized by various parties, and acquisition, use, and processing of related data need to comply with relevant laws, regulations, and standards of relevant regions. For example, in a palm verification payment scenario in the embodiments of this application, palm images of users need to be acquired. The palm images of the users involved are all obtained under full authorization.

"A plurality of" described in this specification refers to two or more. "And/or" describes an association relationship between associated objects and indicates that three relationships may exist. For example, A and/or B may represent the following three cases: Only A exists, both A and B exist, and only B exists. The character "/" generally indicates an "or" relationship between the associated objects.

The foregoing descriptions are merely exemplary embodiments of this application, but are not intended to limit this application. Any modification, equivalent replacement, or improvement made within the spirit and principle of this application shall fall within the protection scope of this application.

The technical features in the foregoing embodiments may be combined in different manners to form other embodiments. For concise description, not all possible combinations of the technical features in the embodiment are described. However, the combinations of the technical features shall all be considered as falling within the scope recorded by this specification provided that no conflict exists.

The foregoing embodiments only describe several implementations of this application, which are described specifically and in detail, but cannot be construed as a limitation to the patent scope of this application. A person of ordinary skill in the art may further make various variations and improvements without departing from the idea of this application, and the variations and improvements shall all fall within the protection scope of this application. Therefore, the protection scope of this application shall be subject to the appended claims.

What is claimed is:

1. A method for detecting a distance of a palm relative to an information acquisition device performed by a computer device, the method comprising:

obtaining an image of a palm and at least one distance value of the palm acquired by the information acquisition device that includes a camera module and a plurality of distance sensors uniformly distributed with the camera module as a center;

determining position information of an identity marker in the image;

determining, according to the at least one distance value, calibration positions corresponding to the plurality of distance sensors in the image;

determining, according to the position information and the calibration positions corresponding to the plurality of distance sensors in the image, at least one target distance sensor detecting the identity marker in the plurality of distance sensors; and determining a distance between the identity marker and the information acquisition device according to the distance value acquired by the at least one target distance sensor.

2. The method according to claim 1, wherein the determining, according to the at least one distance value, calibration positions corresponding to the plurality of distance sensors in the image comprises:

separately determining, for each distance sensor in the plurality of distance sensors, the calibration position corresponding to the distance sensor in the image according to the distance value acquired by the distance sensor and a position calibration policy of the distance sensor.

3. The method according to claim 2, wherein the method further comprises:

obtaining a field of view and a focal length of the camera module;

determining a position relationship between each distance sensor in the plurality of distance sensors and the camera module;

separately determining at least two mapping relationships of each distance sensor according to the position relationship between each distance sensor and the camera module, the field of view, and the focal length, wherein the mapping relationship is a correspondence between the distance value and the calibration position; and determining a position calibration policy of each distance sensor according to the at least two mapping relationships of the distance sensor.

4. The method according to claim 2, wherein the plurality of distance sensors comprise n distance sensors, n is an integer greater than 1, and the separately determining, for each distance sensor in the plurality of distance sensors, the calibration position corresponding to the distance sensor in the image according to the distance value acquired by the distance sensor and a position calibration policy of the distance sensor comprises:

determining, for an $i^{th}$ distance sensor in the n distance sensors, the calibration position corresponding to the $i^{th}$ distance sensor in the image according to the distance value acquired by the $i^{th}$ distance sensor and the position calibration policy of the $i^{th}$ distance sensor, wherein i is a positive integer less than or equal to n; and the position calibration policy of the $i^{th}$ distance sensor is configured for describing a mapping relationship between the distance value acquired by the $i^{th}$ distance sensor and the calibration position corresponding to the $i^{th}$ distance sensor.

5. The method according to claim 1, wherein the determining, according to the position information and the calibration positions corresponding to the plurality of distance sensors in the image, at least one target distance sensor detecting the identity marker in the plurality of distance sensors comprises:

determining a region occupied by the identity marker in the image according to the position information;

selecting at least one calibration position located in the region from the calibration positions corresponding to the plurality of distance sensors in the image; and determining each distance sensor corresponding to the selected at least one calibration position as the at least one target distance sensor detecting the identity marker in the plurality of distance sensors.

6. The method according to claim 1, wherein the determining a distance between the identity marker and the information acquisition device according to the distance value acquired by the at least one target distance sensor comprises:

determining, when a plurality of target distance sensors exist, an average value of the distance values respectively acquired by the corresponding plurality of target distance sensors as the distance between the identity marker and the information acquisition device.

7. The method according to claim 1, further comprising:

performing, when a quantity of the target distance sensors is greater than or equal to a preset quantity threshold, the operation of determining a distance between the identity marker and the information acquisition device according to the distance value acquired by the at least one target distance sensor.

8. The method according to claim 1, further comprising:

obtaining a first distance corresponding to a first image of the palm and a second distance corresponding to a second image of the palm, an image acquisition moment of the second image being different from an image acquisition moment of the first image;

determining a distance difference between the first distance and the second distance;

obtaining a time difference between the image acquisition moment of the first image and the image acquisition moment of the second image;

determining a movement speed of the identity marker according to the distance difference and the time difference; and determining that the identity marker meets the verification condition when the movement speed is less than or equal to a preset speed threshold within a preset duration.

9. A computer device, comprising a processor and a memory, the memory having computer-readable instructions stored therein, and the computer-readable instructions, when loaded and executed by the processor, causing the computer device to implement a method for detecting a distance of a palm relative to an information acquisition device, the method including:

obtaining an image of a palm and at least one distance value of the palm acquired by the information acquisition device that has a camera module and a plurality of distance sensors uniformly distributed with the camera module as a center;

determining position information of an identity marker in the image;

determining, according to the at least one distance value, calibration positions corresponding to the plurality of distance sensors in the image;

determining, according to the position information and the calibration positions corresponding to the plurality of distance sensors in the image, at least one target distance sensor detecting the identity marker in the plurality of distance sensors; and determining a distance between the identity marker and the information acquisition device according to the distance value acquired by the at least one target distance sensor.

10. The computer device according to claim 9, wherein the determining, according to the at least one distance value, calibration positions corresponding to the plurality of distance sensors in the image comprises:

separately determining, for each distance sensor in the plurality of distance sensors, the calibration position corresponding to the distance sensor in the image according to the distance value acquired by the distance sensor and a position calibration policy of the distance sensor.

11. The computer device according to claim 10, wherein the method further comprises:

obtaining a field of view and a focal length of the camera module;

determining a position relationship between each distance sensor in the plurality of distance sensors and the camera module;

separately determining at least two mapping relationships of each distance sensor according to the position relationship between each distance sensor and the camera module, the field of view, and the focal length, wherein the mapping relationship is a correspondence between the distance value and the calibration position; and determining a position calibration policy of each distance sensor according to the at least two mapping relationships of the distance sensor.

12. The computer device according to claim 10, wherein the plurality of distance sensors comprise n distance sensors, n is an integer greater than 1, and the separately determining, for each distance sensor in the plurality of distance sensors, the calibration position corresponding to the distance sensor in the image according to the distance value acquired by the distance sensor and a position calibration policy of the distance sensor comprises:

determining, for an $i^{th}$ distance sensor in the n distance sensors, the calibration position corresponding to the $i^{th}$ distance sensor in the image according to the distance value acquired by the $i^{th}$ distance sensor and the position calibration policy of the $i^{th}$ distance sensor, wherein i is a positive integer less than or equal to n; and the position calibration policy of the $i^{th}$ distance sensor is configured for describing a mapping relationship between the distance value acquired by the $i^{th}$ distance sensor and the calibration position corresponding to the $i^{th}$ distance sensor.

13. The computer device according to claim 9, wherein the determining, according to the position information and the calibration positions corresponding to the plurality of distance sensors in the image, at least one target distance sensor detecting the identity marker in the plurality of distance sensors comprises:

determining a region occupied by the identity marker in the image according to the position information;

selecting at least one calibration position located in the region from the calibration positions corresponding to the plurality of distance sensors in the image; and determining each distance sensor corresponding to the selected at least one calibration position as the at least one target distance sensor detecting the identity marker in the plurality of distance sensors.

14. The computer device according to claim 9, wherein the determining a distance between the identity marker and the information acquisition device according to the distance value acquired by the at least one target distance sensor comprises:

determining, when a plurality of target distance sensors exist, an average value of the distance values respectively acquired by the corresponding plurality of target distance sensors as the distance between the identity marker and the information acquisition device.

15. The computer device according to claim 9, wherein the method further comprises:

performing, when a quantity of the target distance sensors is greater than or equal to a preset quantity threshold, the operation of determining a distance between the identity marker and the information acquisition device according to the distance value acquired by the at least one target distance sensor.

16. The computer device according to claim 9, wherein the method further comprises:

obtaining a first distance corresponding to a first image of the palm and a second distance corresponding to a second image of the palm, an image acquisition moment of the second image being different from an image acquisition moment of the first image;

determining a distance difference between the first distance and the second distance;

obtaining a time difference between the image acquisition moment of the first image and the image acquisition moment of the second image;

determining a movement speed of the identity marker according to the distance difference and the time difference; and determining that the identity marker meets the verification condition when the movement speed is less than or equal to a preset speed threshold within a preset duration.

17. A non-transitory computer-readable storage medium, having computer-readable instructions stored therein, and the computer-readable instructions, when loaded and executed by a processor of a computer device, causing the computer device to implement a method for detecting a distance of a palm relative to an information acquisition device, the method including:

obtaining an image of a palm and at least one distance value of the palm acquired by the information acquisition device that has a camera module and a plurality of distance sensors uniformly distributed with the camera module as a center;

determining position information of an identity marker in the image;

determining, according to the at least one distance value, calibration positions corresponding to the plurality of distance sensors in the image;

determining, according to the position information and the calibration positions corresponding to the plurality of distance sensors in the image, at least one target distance sensor detecting the identity marker in the plurality of distance sensors; and determining a distance between the identity marker and the information acquisition device according to the distance value acquired by the at least one target distance sensor.

18. The non-transitory computer-readable storage medium according to claim 17, wherein the determining, according to the position information and the calibration positions corresponding to the plurality of distance sensors in the image, at least one target distance sensor detecting the identity marker in the plurality of distance sensors comprises:

determining a region occupied by the identity marker in the image according to the position information;

selecting at least one calibration position located in the region from the calibration positions corresponding to the plurality of distance sensors in the image; and determining each distance sensor corresponding to the selected at least one calibration position as the at least one target distance sensor detecting the identity marker in the plurality of distance sensors.

19. The non-transitory computer-readable storage medium according to claim 17, wherein the method further comprises:

performing, when a quantity of the target distance sensors is greater than or equal to a preset quantity threshold, the operation of determining a distance between the identity marker and the information acquisition device according to the distance value acquired by the at least one target distance sensor.

20. The non-transitory computer-readable storage medium according to claim 17, wherein the method further comprises:

obtaining a first distance corresponding to a first image of the palm and a second distance corresponding to a second image of the palm, an image acquisition moment of the second image being different from an image acquisition moment of the first image;

determining a distance difference between the first distance and the second distance;

obtaining a time difference between the image acquisition moment of the first image and the image acquisition moment of the second image;

determining a movement speed of the identity marker according to the distance difference and the time difference; and determining that the identity marker meets the verification condition when the movement speed is less than or equal to a preset speed threshold within a preset duration.

* * * * *